US 6,750,892 B2

(12) United States Patent
Suzuki

(10) Patent No.: US 6,750,892 B2
(45) Date of Patent: Jun. 15, 2004

(54) DENSITY CORRECTION METHOD AND IMAGE FORMING APPARATUS

(75) Inventor: Takayoshi Suzuki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/904,093

(22) Filed: Jul. 13, 2001

(65) Prior Publication Data

US 2002/0113856 A1 Aug. 22, 2002

(30) Foreign Application Priority Data

Jul. 13, 2000 (JP) ........................................ 2000-212865
Jul. 10, 2001 (JP) ........................................ 2001-209581

(51) Int. Cl.[7] .......................... B41J 2/385; G03G 13/04
(52) U.S. Cl. .......................... 347/133; 347/131; 399/49; 399/72
(58) Field of Search .............................. 347/133, 131, 347/129, 225, 246, 254; 399/49, 51, 52, 72

(56) References Cited

U.S. PATENT DOCUMENTS

| 4,478,504 A | * | 10/1984 | Tanaka ........................ 347/129 |
| 4,855,766 A | * | 8/1989 | Suzuki ........................ 347/133 |
| 4,929,970 A | * | 5/1990 | Inui ........................... 347/133 |
| 5,250,988 A | * | 10/1993 | Matsuura et al. ............... 399/51 |
| 5,274,424 A | * | 12/1993 | Hattori et al. ................. 399/49 |
| 5,323,183 A | * | 6/1994 | Tateoka et al. ............... 347/254 |
| 5,327,209 A | * | 7/1994 | Sasanuma et al. ............. 347/129 |
| 5,517,227 A | * | 5/1996 | Atsumi et al. ............... 347/131 |
| 5,633,669 A | * | 5/1997 | Hada et al. .................. 347/131 |
| 5,774,762 A | * | 6/1998 | Takemoto et al. ............. 399/51 |
| 5,839,020 A | * | 11/1998 | Rushing et al. ............... 399/49 |
| 5,907,344 A | * | 5/1999 | Tanimoto et al. ............. 347/131 |
| 5,999,761 A | * | 12/1999 | Binder et al. ................. 399/49 |

FOREIGN PATENT DOCUMENTS

| JP | 56-74275 | | 6/1981 | | |
| JP | 60-16058 | | 1/1985 | | |
| JP | 63303373 A | * | 12/1988 | .......... | G03G/15/01 |
| JP | 10-297017 | | 11/1998 | | |
| JP | 2000-190554 | * | 7/2000 | | |
| JP | 2001109207 A | * | 4/2001 | .......... | G03G/15/00 |

* cited by examiner

Primary Examiner—Susan S. Y. Lee
(74) Attorney, Agent, or Firm—Morgan, Lewis & Bockius LLP

(57) ABSTRACT

Based on the density of an image formed on a photosensitive member or an image recording medium, an amount of correction for uniformalizing the image density in a main scanning direction of a light beam is set. Based on the set amount of correction, the intensity of a light beam in an image region is corrected within a range of one main scan.

26 Claims, 26 Drawing Sheets

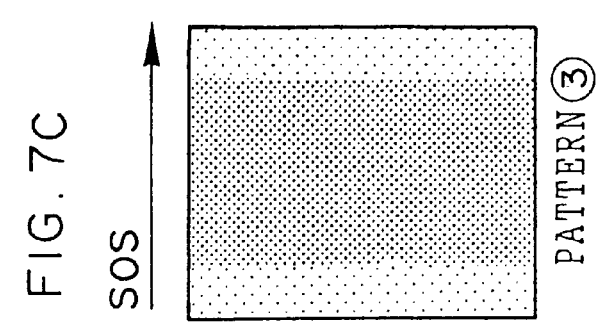
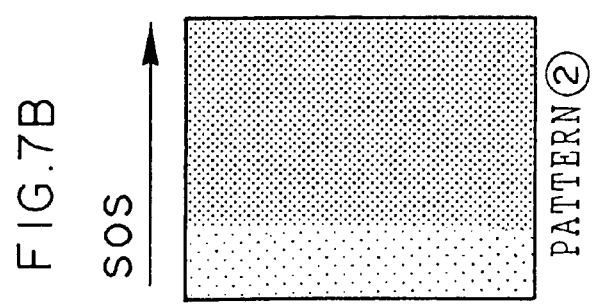
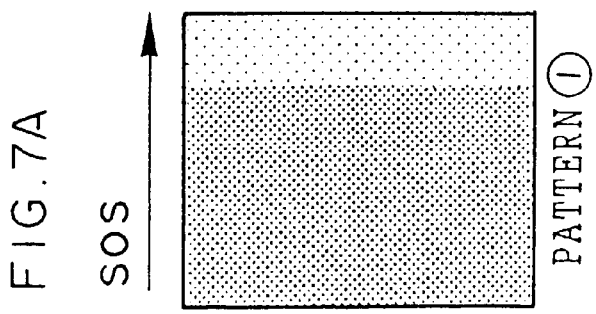

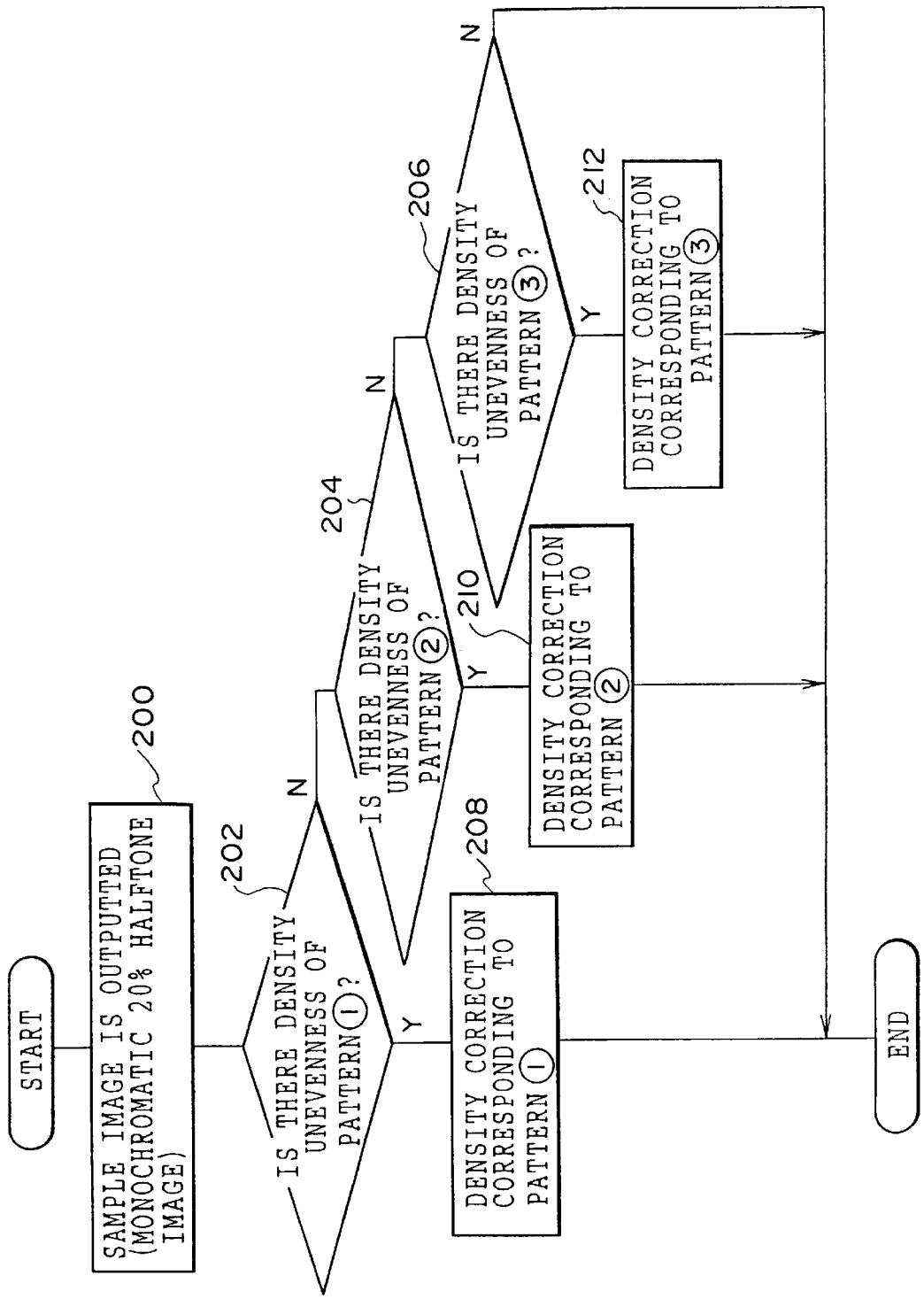

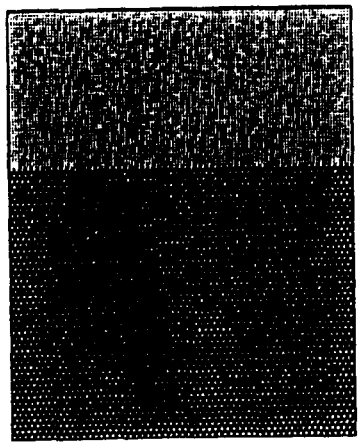
FIG. 16C PATTERN①C
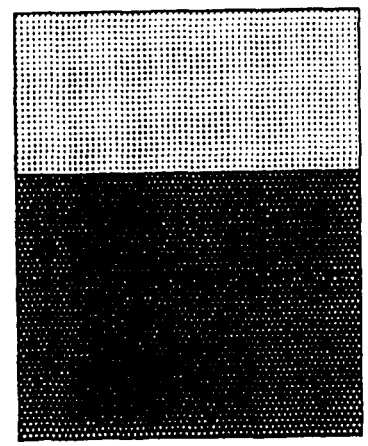
FIG. 16B PATTERN①B
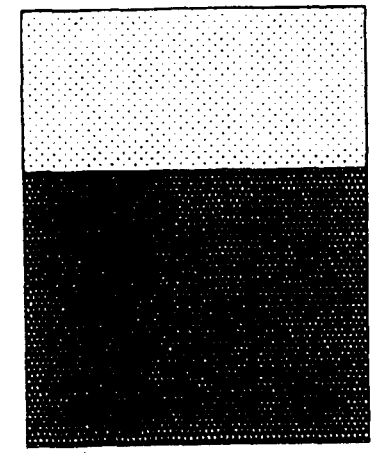
FIG. 16A PATTERN①A

DENSITY CORRECTION METHOD AND IMAGE FORMING APPARATUS

BACKGROUND OF THE INVENTION

1. Field of the Invention

The present invention relates to a density correction method and an image forming apparatus, and particularly to an image forming apparatus, in which a latent image is formed by scanning a light beam on an image retaining member or by causing light from an array light source to be imaged on an image retaining member, and the latent image is subjected to development and transferred to an image recording medium, and an image is formed on the image recording medium, and to a density correction method in the image forming apparatus.

2. Description of the Related Art

There have spread image forming apparatuses, for example, an image forming apparatus such as a laser printer or an electrophotographic copying machine, in which an image is formed by irradiating a light beam on a photosensitive member while scanning the light beam thereon, or an image forming apparatus in which an image is formed by causing light from a light source formed by arrangement of a plurality of light emitting elements such as an LED array, that is, a plurality of light emission points (hereinafter referred to as an "array light source"), to be imaged on a photosensitive member by using a SELFOC lens or the like. In such image forming apparatuses, when an image is formed on an image recording medium such as paper, the density of coloring materials may become ununiform (density unevenness).

It has conventionally been known that, in a light scanning apparatus in which a light beam is scanned by using a deflector such as a polygon mirror, the intensity of a light beam is changed in order to correct uneven density caused by variation in irradiation energy in a region in which the light beam is scanned.

For example, in Japanese Patent Application Laid-Open (JP-A) No. 56-74275, the technique is proposed, wherein in order to prevent the light intensity per unit area of a light beam from decreasing as an angle of incidence θ of the light beam on a photosensitive material drum 300 becomes large (see FIG. 23), setting of driving current is carried out so that the output power level increases as the angle of incidence of the light beam on the photosensitive material drum 300 becomes larger (see FIGS. 24A to 24C).

In JP-A No. 60-16058, the technique has been proposed, wherein in order to prevent a change in the beam intensity on a scanning surface by variation in the reflectance caused by the change in the angle of incidence of the light beam on a light deflector (see FIG. 25), bias current $I_1$ is changed in accordance with an angle of incidence Ψ on the deflector.

Further, in JP-A No. 10-297017, the technique has been proposed, wherein in order to correct variations in the amount of light of an LED array, driving current of the LED is changed based on correction data of variations in the amount of light (see FIG. 26).

Due to the variation in irradiation energy in a region in which a light beam is scanned, or the variation in the amount of light of the LED array being corrected as described above, uneven density in the direction in which a light beam is scanned, or a direction in which light emitting elements (light emission points) of the LED array are arranged (which both directions will be hereinafter generically referred to as a "scanning direction of a light beam"), that is, a direction perpendicular to a direction in which an image is formed on a photosensitive member or an image recording medium, is alleviated.

Uneven density in the scanning direction of a light beam on a light image recording medium, is not necessarily caused by only energy of a light beam irradiated on the photosensitive member or variation in the energy density (ununiform irradiation).

In addition to the above-described ununiform irradiation caused by a light beam, for example, ununiform charging caused by ununiformity of a corotoron or a charge roll for applying a charge to a photosensitive member (ununiformity of charging caused in the photosensitive member), variations in the amount of a toner in a development roll of a developing machine which supplies the toner to a latent image formed on the photosensitive member (variations in the density of toner), and an ununiform distance between the development roll and the photosensitive member (variations in the distance) each cause ununiform density of coloring materials at the time of forming a toner image on the photosensitive member. As a result, uneven density of coloring materials is caused on the image recording medium.

Further, even if uneven density of coloring materials occurs in the toner image formed on the photosensitive member, uneven density of coloring materials is also caused on the image recording medium due to ununiformity of charging by a transfer corotoron or a transfer roller for transferring, to a transfer printing medium (i.e., intermediate transfer material, paper, or the like), the toner image on the photosensitive member (ununiform charging caused in the transfer material) or due to ununiform nipping force (variations in the nipping force).

However, in the above-described conventional techniques, ununiform irradiation by a light beam is only corrected, and therefore, uneven density on an image recording medium with a final image formed thereon, cannot be corrected. Particularly, in a case of a full color image, there exists a problem in that if uneven density is not corrected, color hue varies and an image of high quality cannot be obtained.

SUMMARY OF THE INVENTION

The present invention has been devised in order to solve the above-described problems, and an object thereof is to provide a density correction method and an image forming apparatus, which allow reduction in the uneven density of an image in a main scan direction of a light beam, or a direction in which light emission points of an array light source are arranged.

In order to achieve the above-described object, according to a first aspect of the present invention, there is provided a density correction method in an image forming apparatus in which a planar latent image is formed by sub-scanning in which a main scanning position of a light beam is moved relatively to an image retaining member while main scanning of a light beam is being effected on the image retaining member, and the latent image is developed and transferred to an image recording medium, thereby forming an image on the image recording medium, the method comprising the step of: based on the density of an image on one of the image retaining member and the image recording medium, correcting an intensity of the light beam in an image region within a range of one main scan so as to allow correction of uniformity of the image density in the main scanning direction of the light beam.

In accordance with the first aspect of the present invention, based on the density of an image on the image retaining member or on the image recording medium, the intensity of the light beam in the image region is corrected within the range of one main scan so that ununiformity of the image density in the main scanning direction of the light beam is corrected. That is, unlike the conventional methods, the light beam is irradiated on the image retaining member while the intensity (amount of light) of the light beam is being corrected within one main scan based on the density of a formed image. Accordingly, any density unevenness caused by, not only ununiform irradiation, but also ununiformity of charging caused in the image retaining member, variations in the density of toner, variations in the distance, ununiform charging caused in the transfer material, variations in the nipping force, and the like is solved (reduced), and density unevenness in the image region can be reduced.

At this time, in accordance with a second aspect of the present invention, preferably, after the intensity of the light beam is in advance controlled automatically at a predetermined intensity level, based on the density of an image on one of the image retaining member and the image recording medium, the intensity of the light beam in the image region is corrected within a range of one main scan, and when an amount of correction in the intensity of a light beam based on the image density is changed, the intensity is changed so that one of an intensity of the light beam in a predetermined portion of the image region, and an average value of intensities of the light beams in the main scanning direction becomes substantially equal before and after the amount of correction is changed.

That is, after the intensity of the light beam has been in advance controlled automatically at the predetermined intensity level, the light beam is irradiated on the image retaining member while the intensity of the light beam is being corrected within one main scan so as to allow correction of density unevenness in the image region. When the amount of correction is changed (including a case in which a state of making no correction is changed to a state of making a correction), the intensity level is changed so that the intensity of the light beam in a predetermined portion of the image region, or an average value of the intensities of the light beam in the main scanning direction becomes substantially equal before and after the amount of correction is changed. As a result, variations in the image density in the vicinity of, for example, a central portion of the image region having the highest visibility due to the change in the amount of correction is prevented. Accordingly, any density unevenness caused by, not only uniform irradiation, but also other factors is eliminated (reduced), and when a color image is formed, ununiform color tone caused by relative density differences between colors can be prevented.

Further, in a third aspect of the present invention, there is provided a density correction method in an image forming apparatus in which a planar latent image is formed by causing light from an array light source having plural light emission points arranged therein, to be imaged in an image forming region on an image retaining member and by effecting sub-scanning in which a position at which the light is imaged, is moved relatively to the image retaining member, and the latent image is developed and transferred to an image recording medium, thereby forming an image on the image recording medium, the method comprising the step of: based on the density of an image on one of the image retaining member and the image recording medium, correcting light emission intensities of the plural light emission points in a direction in which the light emission points are arranged, so as to allow correction of uniformity of the image density in the direction in which the light emission points are arranged.

In accordance with the third aspect of the present invention, based on the density of an image on the image retaining member or the image recording medium, light emission intensities of the plural light emission points of an array light source such as an LED array, that is, intensities of output light from the light emission points are each corrected in the direction in which the light emission points are arranged (that is, in the main scanning direction) so that ununiformity of the image density in the direction in which the light emission points are arranged is corrected. In other words, a light beam is irradiated on the image retaining member while the output intensities of the light emission points are being corrected based on the density of a formed image, not based on ununiformity in the amount of light from the array light source. Accordingly, any density unevenness caused by, not only ununiformity in the amount of light, but also ununiformity of charging caused in the image retaining member, variations in the density of toner, variations in the distance, ununiform charging caused in the transfer material, variations in the nipping force, and the like is eliminated (reduced), and density unevenness in the image region can be reduced.

At this time, in a fourth aspect of the present invention, preferably, after the light emission intensities of the plural light emission points are each previously controlled automatically at a predetermined level, based on the density of an image on one of the image retaining member and the image recording medium, the respective light emission intensities of the plural light emission points in the direction in which the light emission points are arranged, are corrected, and when an amount of correction of the light emission intensities based on the image density is corrected, the intensity level is changed so that one of the light emission intensity in a predetermined portion of the image forming region, and an average value of the light emission intensities in the direction in which the light emission points are arranged, becomes substantially equal before and after the amount of correction is changed.

That is, after the light emission intensities of the plural light emission points have been each automatically controlled in advance at a predetermined intensity level, a light beam is irradiated on the image retaining member while the light emission intensities of the light emission points are being corrected so as to correct density unevenness in the direction in which the light emission points are arranged in the image region (i.e., in the main scanning direction). When the amount of correction is changed (including a case in which a state of making no correction is changed to a state of making a correction), the intensity level is changed so that the light emission intensity in a predetermined portion of the image region, or an average value of the light emission intensities in the direction in which the light emission points are arranged, becomes substantially equal before and after the amount of correction is changed. As a result, variations in the image density in the vicinity of, for example, a central portion of the image region having the highest visibility due to the change in the amount of correction is prevented. Accordingly, any density unevenness caused by, not only uniformity in the amount of light of the array light source, but also other factors is eliminated (reduced), and when a color image is formed, ununiform color tone caused by relative density differences between colors can be prevented.

Further, in a fifth aspect of the present invention, when the intensity level is changed, the amount of correction is changed if the changed intensity level exceeds a predetermined range, thereby allowing the intensity level to be held within the predetermined range.

In accordance with a sixth aspect of the present invention, there is provided an image forming apparatus in which a planar latent image is formed by sub-scanning in which a main scanning position of a light beam is moved relatively to an image retaining member while main scanning of a light beam is being effected on the image retaining member, and the latent image is developed and transferred to an image recording medium, thereby forming an image on the image recording medium, the apparatus comprising: amount-of-correction setting means for setting, based on the density of an image on one of the image retaining member and the image recording medium, an amount of correction for correcting ununiformity of the image density in the main scanning direction of the light beam; and correction means for correcting, based on the amount of correction set by the amount-of-correction setting means, an intensity of the light beam in the image region within a range of one main scan.

According to the sixth aspect of the present invention, based on the density of an image on the image retaining member or the image recording medium, an amount of correction for correcting ununiformity of the image density in the main scanning direction of the light beam is set by the amount-of-correction setting means. Based on the amount of correction, the intensity of the light beam in the image region is corrected by the correction means within a range of one main scan.

As a result, in the same manner as in the first aspect, the light beam is irradiated on the image retaining member while the intensity of the light beam (the amount of light) is being corrected within one main scan based on the density of a formed image. Accordingly, any density unevenness caused by, not only ununiform irradiation, but also ununiformity of charging caused in the image retaining member, variations in the density of toner, variations in the distance, ununiform charging caused in the transfer material, variations in the nipping force, and the like can be eliminated (reduced).

In a seventh aspect of the present invention, preferably, intensity control means for automatically controlling the intensity of the light beam at a predetermined intensity level, and intensity level changing means which, when setting of the amount of correction by the amount-of-correction setting means is changed, changes the intensity level so that one of the intensity of the light beam in a predetermined portion of the image region, and an average value of intensities of the light beam in the main scanning direction becomes substantially equal before and after the setting is changed, are further provided.

That is, the intensity of the light beam is automatically controlled at a predetermined intensity level by the intensity control means. In image forming apparatuses, generally, such automatic control for the intensity of the light beam as described above is carried out (so-called APC: Auto Power Control). When the amount of correction set by the amount-of-correction setting means is changed (including a case in which a state of making no correction is changed to a state of making a correction), the intensity level is changed by the intensity level changing means so that the intensity of the light beam in a predetermined portion of the image region, or an average value of the intensities of the light beam in the main scanning direction, becomes substantially equal before and after the amount of correction is changed. As a result, variations in the image density in the vicinity of, for example, a central portion of the image region having the highest visibility due to the change in the amount of correction is prevented. Accordingly, in the same manner as in the second aspect, any density unevenness caused by, not only uniform irradiation, but also other factors is eliminated (reduced), and when a color image is formed, ununiform color tone caused by relative density differences between colors can be prevented.

Further, according to an eighth aspect of the present invention, there is provided an image forming apparatus in which a planar latent image is formed by causing light from an array light source having plural light emission points arranged therein, to be imaged in an image forming region on an image retaining member, by effecting sub-scanning in which a position at which the light is imaged, is moved relatively to the image retaining member, and the latent image is developed and transferred to an image recording medium, thereby forming an image on the image recording medium, the apparatus comprising: amount-of-correction setting means for setting, based on the density of an image on one of the image retaining member and the image recording medium, an amount of correction for allowing correction of ununiformity of the image density in the direction in which the light emission points are arranged; and correction means for correcting, based on the amount of correction set by the amount-of-correction setting means, light emission intensities of the plural light emission points in the direction in which the light emission points are arranged.

In accordance with the eighth aspect of the present invention, based on the density of an image on the image retaining member or the image recording medium, an amount of correction for correcting ununiformity of the image density in the direction in which the light emission points are arranged (i.e., in the main scanning direction) is set by the amount-of-correction setting means. Based on the amount of correction, the light emission intensities of the plural light emission points are each corrected by the correction means in the direction in which the light emission points are arranged.

As a result, in the same manner as in the third aspect of the present invention, the light beam is irradiated on the image retaining member while output intensities of the light emission points are being corrected based on the density of a formed image. Accordingly, any density unevenness caused by, not only ununiformity in the amount of light, but also ununiformity of charging caused in the image retaining member, variations in the density of toner, variations in the distance, ununiform charging caused in the transfer material, variations in the nipping force, and the like can be eliminated (reduced).

According to a ninth aspect of the present invention, preferably, intensity control means for automatically controlling each of light emission intensities of the plural light emission points at a predetermined intensity level, and intensity level changing means which, when setting of the amount of correction by the amount-of-correction setting means is changed, changes the intensity level so that one of the light emission intensity in the predetermined portion of the image region, and an average value of the light emission intensities in the direction in which the light emission points are arranged becomes substantially equal before and after the setting is changed, are further provided.

That is, the light emission intensities of the light emission points are each automatically controlled at a predetermined intensity level by the intensity control means. In image forming apparatuses, generally, such automatic control for the light emission intensities is carried out based on variations measured at the time of manufacturing so as to allow correction for manufacturing variations in the light emission intensity between the light emission points. When the amount of correction set by the amount-of-correction setting means is changed (including a case in which a state of making no correction is changed to a state of making a correction), the intensity level is changed by the intensity level control means so that the light emission intensity in a predetermined portion of the image region, or an average value of light emission intensities in the direction in which the light emission points are arranged, becomes substantially equal before and after the amount of correction is changed. As a result, variations in the density of an image in the vicinity of, for example, a central portion having the highest visibility are prevented. As a result, in the same manner as in the fourth aspect, any density unevenness caused by, not only uniformity in the amount of light of the array light source, but also other factors is eliminated (reduced), and when a color image is formed, ununiform color tone caused by relative density differences between colors can be prevented.

In the above-described sixth to ninth aspects of the present invention, according to a tenth aspect of the present invention, preferably, amount-of-correction changing means is provided which makes a determination as to whether the intensity level changed by the intensity level changing means is within the predetermined range, and when it is determined that the changed intensity level exceeds the predetermined range, the amount-of-correction changing means changes the amount of correction so that the intensity level is held within the predetermined range. Further, according to an eleventh aspect of the present invention, preferably, alarm signal output means is provided which makes a determination as to whether the intensity level changed by the intensity level changing means is within the predetermined range, and when it is determined that the changed intensity level exceeds the predetermined range, the alarm signal output means outputs an alarm signal.

Moreover, according to a twelfth aspect of the present invention, preferably, pattern input means for inputting information which indicates a correction pattern of the image density, is provided, and the amount-of-correction setting means determines the amount of correction based on the information inputted from the pattern input means. At this time, in a thirteenth aspect of the present invention, preferably, level input means for inputting information which indicates a correction level of the image density, is provided, and the amount-of-correction setting means determines the amount of correction based on the information inputted from the level input means.

Still further, according to a fourteenth aspect of the present invention, preferably, detecting means for automatically detecting the density of an image on one of the image retaining member and the image recording medium, is provided, and the amount-of-correction setting means determines the amount of correction based on a result of detection by the detecting means.

BRIEF DESCRIPTION OF THE DRAWINGS

FIGS. 7A to 7C are conceptual diagrams showing patterns of uneven density occurring in a main scanning direction.

FIG. 8 is a flow chart showing an overall flow of correction processing according to the first embodiment.

FIGS. 16A to 16C are diagrams showing patterns of uneven density, which are different according to a level of uneven density.

DESCRIPTION OF THE PREFERRED EMBODIMENTS

First Embodiment

One of embodiments according to the present invention will be hereinafter described in detail with reference to the attached drawings.

Overall Structure

Figure 1:
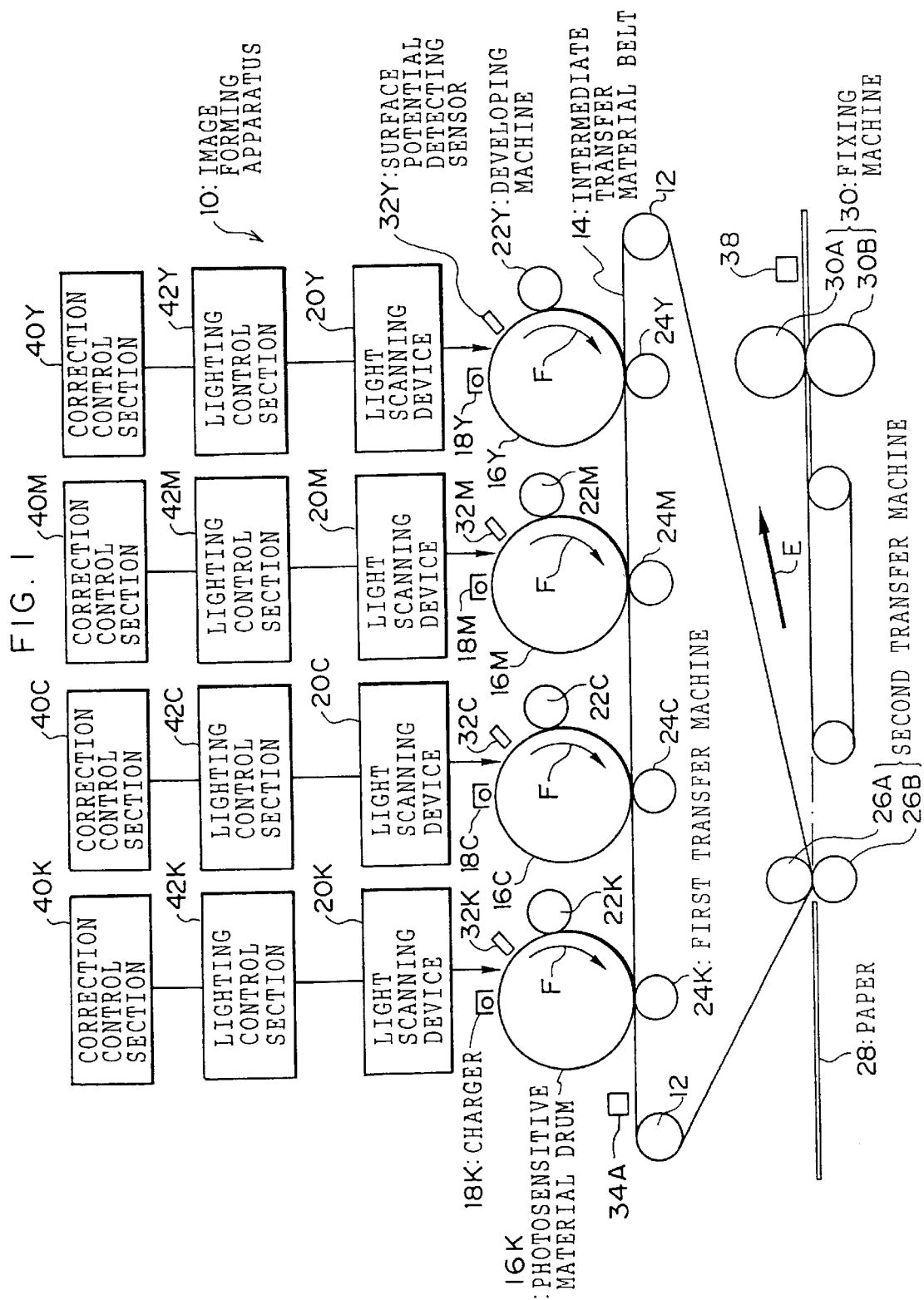
FIG. 1 is a schematic structural diagram of an image forming apparatus (of a scanning-exposure type) according to a first embodiment of the present invention.

FIG. 1 shows an image forming apparatus to which the present invention is applied. As illustrated in FIG. 1, the image forming apparatus 10 includes a plurality of photosensitive material drums (hereinafter referred to as photosensitive members) 16, each of which serves an image retaining member, rotating at a predetermined speed in the direction indicated by arrow F (corresponding to a sub-scanning direction) and disposed along a direction in which an intermediate transfer material belt 14 having an endless belt-shaped configuration is conveyed, which belt is stretched on a plurality of winding rollers 12 and conveyed in the direction indicated by arrow E by driving of a motor (not shown).

The image forming apparatus 10 according to the present embodiment is provided so as to process a color image, and therefore, photosensitive members 16Y, 16M, 16C, and 16K are provided so as to correspond to four colors of yellow (Y), magenta (M), cyan (C), and black (K), respectively. Members provided for the different colors are each shown by adding an abbreviated letter (Y/M/C/K) indicating each color at the end of a reference numeral in the same way as described above, but when they will be described without making no distinction of colors, the abbreviated letter to be added at the end of a reference numeral will be omitted.

A charger 18 is disposed around each of the photosensitive members 16 so as to uniformly charge the surface of the corresponding photosensitive member 16. A light scanning device 20 (of which details will be described later) is disposed above each of the photosensitive members 16 and provided so as to scan to irradiate a light beam based on a desired image, in the axial direction of the corresponding photosensitive member 16 uniformly charged with the charger 18, thereby forming an electrostatic latent image on the photosensitive member 16.

Further, a developing machine 22, a first transfer machine 24, a cleaner (not shown), and a charge removing lamp (not shown) are sequentially disposed around each photosensitive member 16 further at the downstream side than a position at which a light beam is irradiated in a direction in which the photosensitive member 16 rotates. The developing machine 22 effects development for an electrostatic latent image formed on the photosensitive member 16 by means of a toner having a predetermined color (yellow/magenta/cyan/black) to thereby form a toner image. The first transfer machine 24 transfers the toner image formed on the photosensitive member 16, onto the intermediate transfer material belt 14. The cleaner (not shown) removes the toner remaining on the photosensitive member 16 after the transfer, and the charge removing lamp (not shown) removes a charge from the photosensitive member 16.

Toner images of different colors formed on the photosensitive members 16 are each transferred onto a belt surface of the intermediate transfer material belt 14 in an overlapping manner. As a result, a color toner image is formed on the intermediate transfer material belt 14. In the present embodiment, a toner image in which toner images of four colors are thus transferred in an overlapping manner, is referred to as a final toner image.

A second transfer machine 26 comprised of two facing rollers 26A and 26B is disposed further at the downstream side than the photosensitive member 16 in the direction in which the intermediate transfer material belt 14 is conveyed. The final toner image formed on the intermediate transfer material belt 14 is conveyed into a region between the rollers 26A and 26B and transferred onto a paper 28 taken out from a paper tray (not shown) and conveyed into the region between the rollers 26A and 26B. The intermediate transfer material belt 14 and the paper 28 each correspond to the image recording medium of the present invention. When a paper conveying belt or the like is used, the paper conveying belt corresponds to the image recording medium of the present invention.

The paper 28 to which the final toner image is transferred, is conveyed to a fixing machine 30 comprised of a pressure roller 30A and a heating roller 30B, and subjected to fixing processing therein. As a result, the final toner image is fixed and a desired image (a color image) is formed on the paper 28. The paper 28 with the image formed thereon is discharged from the apparatus.

In the image forming apparatus 10, a surface potential detecting sensor 32 for measuring the potential of the surface of a corresponding photosensitive member 16 is disposed around the photosensitive body 16 and between the developing machine 22 and the position at which a light beam is irradiated by the light scanning device 20.

Figure 2:
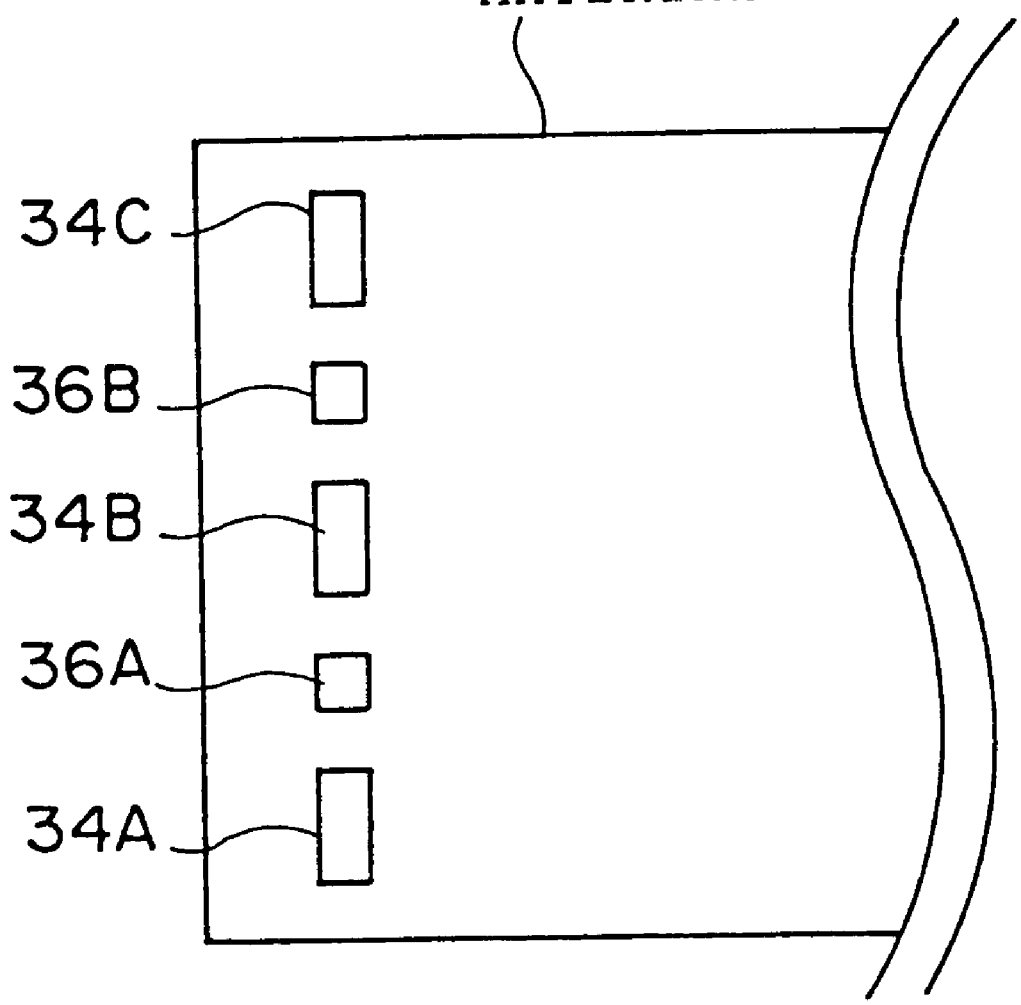
FIG. 2 is a top view of an intermediate transfer material belt in the vicinities of image position detecting sensors and image density detecting sensors, which shows the positions where these detecting sensors are disposed.

Image position detecting sensors 34A, 34B, and 34C for detecting the position of a final toner image transferred onto the intermediate transfer material belt 14, and image density detecting sensors 36A and 36B for detecting the density of the final toner image (see FIG. 2) are provided further at the downstream side than the photosensitive member 16 in the direction in which the intermediate transfer material belt 14 is conveyed. These sensors are disposed along the transverse direction of the intermediate transfer material belt 14. A fixed image detecting sensor 38 is disposed further at the downstream side than the fixing machine 30 in the direction in which the paper 28 is conveyed. The fixed image detecting sensor 38 allows detection of a more accurate density since it detects the density of an image fixed to the paper 28 (i.e., a fixed image).

Outputs of the surface potential detecting sensor 32, the image position detecting sensors 34A, 34B, and 34C, the image density detecting sensors 36A and 36B, and the fixed image detecting sensor 38 are connected to correction control sections 40 (described later in detail) respectively provided for different colors to correct density unevenness of an image. These outputs are used for correction of density unevenness.

The correction control section 40 is connected to a lighting control section 42 (described later in detail) provided for each color. The lighting control section 42 controls lighting of a light beam of the light scanning device 20 for the corresponding color. That is, in the image forming apparatus 10, control of lighting and correction of density can each be carried out independently for each of the colors.

Detailed structure of light scanning devices:

Next, the structure of the light scanning device 20 will be described in detail with reference to FIG. 3.

Figure 3:
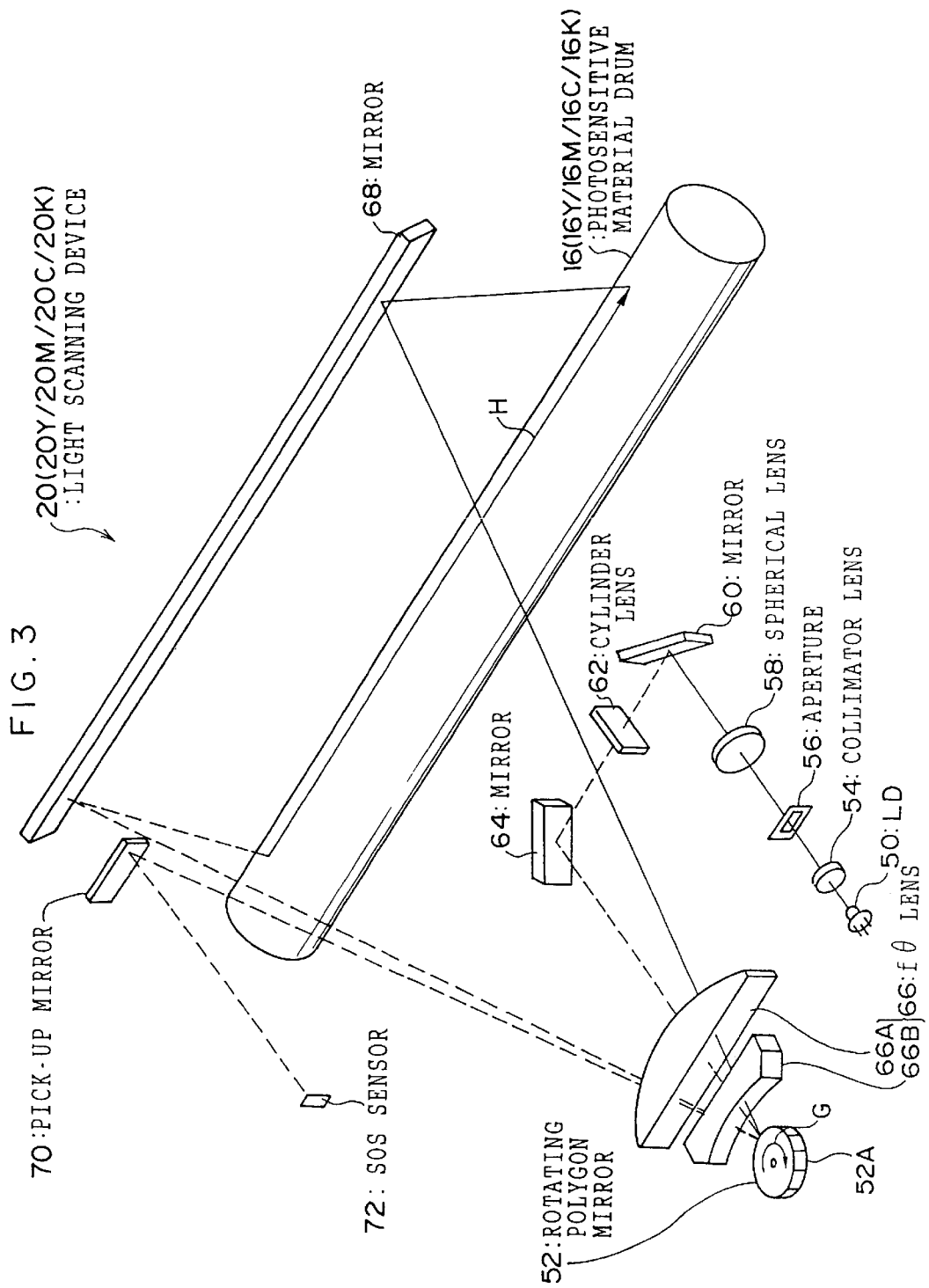
FIG. 3 is a detailed structural diagram of a light scanning device according to the first embodiment.

As shown in FIG. 3, the light scanning device 20 includes a semiconductor laser (LD) 50 serving as a light source, and a rotating polygon mirror 52 reflecting a light beam emitted from the LD 50 and irradiating the light beam on the photosensitive member 16.

The LD 50 is connected to the lighting control section 42, and based on control by the lighting control section 42, emits a light beam.

A collimator lens 54, an aperture 56, a spherical lens 58, a mirror 60, a cylinder lens 62, and a mirror 64 are sequentially disposed at the downstream side in the direction in which the light beam emitted from the LD 50 travels. The light beam emitted from the LD 50 is made into substantially parallel rays by the collimator lens 54, and shaped by the aperture 56, and thereafter, made into diffused light by the spherical lens 58. The light beam made into diffused light is sequentially reflected by the mirror 60 and the mirror 64, and guided to the rotating polygon mirror 52, and simultaneously converged by the cylinder lens 62 in the sub-scanning direction.

An fθ lens 66 comprised of a first lens 66A and a second lens 66B is disposed between the mirror 64 and the rotating polygon mirror 52. The light beam reflected by the mirror 64 is transmitted through the fθ lens 66, and thereafter, made incident on the rotating polygon mirror 52, and further reflected and deflected by the rotating polygon mirror 52. Thereafter, the light beam is transmitted again through the fθ lens 66 (so-called double-pass structure).

The rotating polygon mirror 52 is formed into a regular polygon with a plurality of reflecting surfaces 52A provided on a side surface thereof. The incident light beam is converged on any reflecting surface 52A. The rotating polygon mirror 52 rotates by a motor (not shown) at a predetermined speed in the direction indicated by arrow G. Due to this rotation, the angle of incidence of the light beam on each reflecting surface 52A relatively and continuously changes and the light beam is deflected. As a result, the light beam is irradiated on the photosensitive member 16 while it is scanned in the axial direction of the photosensitive member 16 (that is, the main scanning direction: see the direction indicated by arrow H).

The light beam reflected by the rotating polygon mirror 52 is transmitted again through the fθ lens 66 so that the scanning speed at the time of irradiation of the light beam on the photosensitive member 16 becomes a uniform velocity, and an imaging point is formed on a peripheral surface of the photosensitive member 16. The light beam transmitted through the fθ lens 66 is bent by the mirror 68 and irradiated on the photosensitive member 16.

Further, a pick-up mirror 70 is disposed in the direction in which the light beam transmitted through the fθ lens 66 travels and at the upstream side of the scanning direction. An SOS sensor 72 comprised of a photodetector or the like, is disposed in the direction in which the light beam is reflected by the pick-up mirror 70. A light beam at an end of the side at which scanning is started, among a scanning locus of the light beam is reflected by the pick-up mirror 70 and made incident on the SOS sensor 72.

In other words, the SOS sensor 72 detects a start-of-scan timing (SOS) for each one scan for the photosensitive member 16 by the light scanning device 20, and outputs the result of the detection as an SOS signal. The SOS signal is used for controlling a lighting timing of the LD 50 by a timing setting section (not shown) or for controlling a timing at which density unevenness is corrected by the correction control section 40.

Detailed Structure of Correction Control Section

Next, the structure of the correction control section 40 will be described in detail with reference to FIG. 4.

Figure 4:
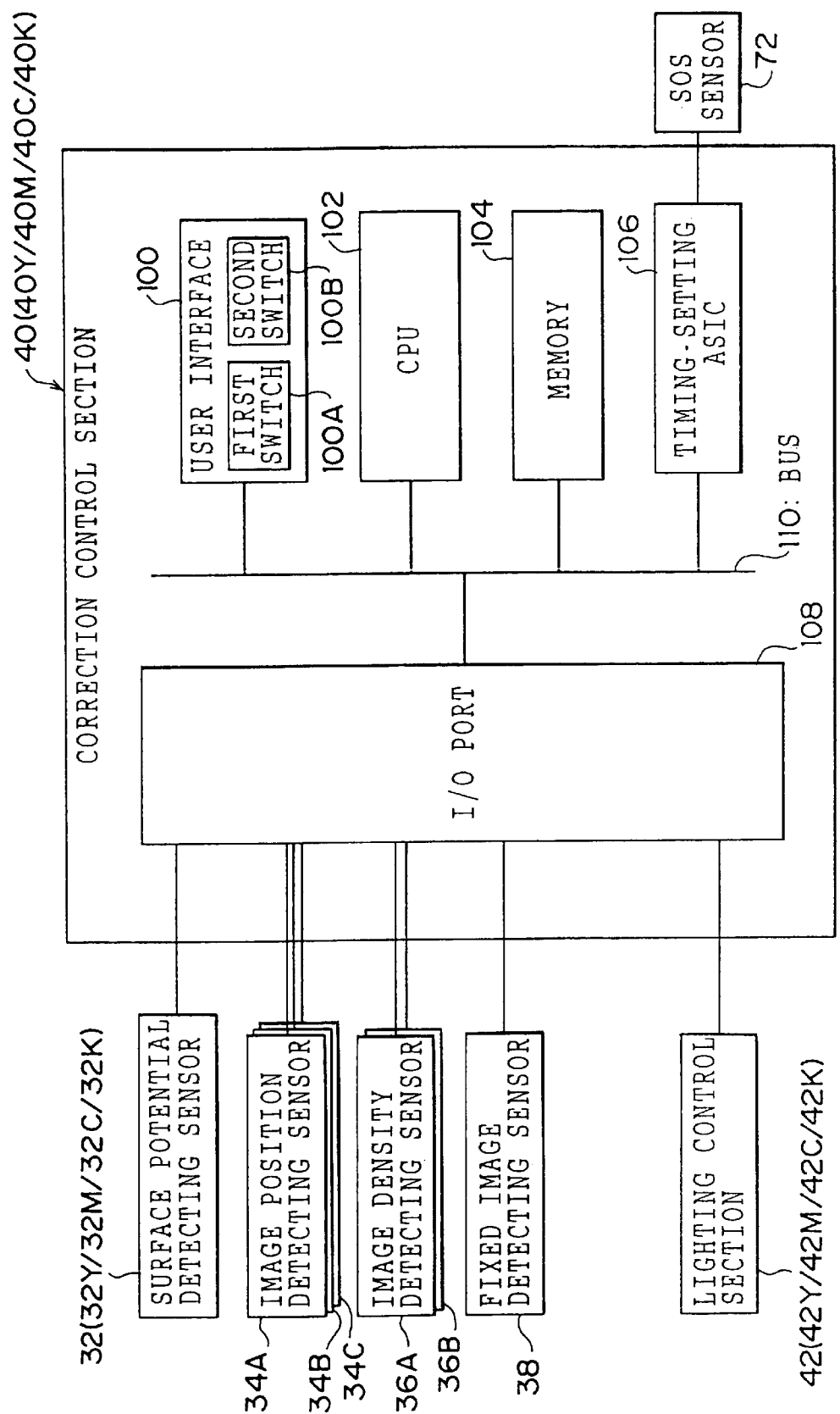
FIG. 4 is a block diagram showing a detailed structure of a correction control section according to the first embodiment.

As shown in FIG. 4, the correction control section 40 is structured in such a manner that a user interface 100 such as a touch panel display, a CPU 102, a memory 104 such as RAM or ROM, a timing-setting ASIC 106, and an I/O port 108 are connected with one another by a bus 110.

The results of detection by the above-described surface potential detecting sensor 32, image position detecting sensors 34A, 34B, and 34C, image density detecting sensors 36A and 36B, and fixed image detecting sensor 38 are each converted into a digital signal by an A/D converter (not shown) and inputted to the correction control section 40 via the I/O port 108. Further, the correction control section 40 outputs each of various signals to a corresponding lighting control section 42 via the I/O port 108.

The user interface 100 includes a first switch 100A for selecting a pattern of uneven density in the main scanning direction by a user's operation, and a second switch 100B for selecting the level (difference of density) by the user's operation. In the correction control section 40, based on the results of selection in the first switch 100A and the second switch 100B by the user, a correction pattern and a correction level (which will be both described in detail in the section of "operation" mentioned later) for correcting uneven density of an image in the main scanning direction of a light beam are set.

The first switch 100A corresponds to a pattern selection means of the present invention and the second switch 100B corresponds to a level selection means of the present invention. The correction pattern and the correction level each correspond to an amount of correction in the present invention. That is, the correction control section 40 has the function of means for setting an amount of correction in the present invention.

The CPU 102 changes set values of the correction pattern and the correction level based on the results of detection inputted from the above-described potential surface detecting sensor 32, image position detecting sensors 34A, 34B, and 34C, image density detecting sensors 36A and 36B, and fixed image detecting sensor 38. Further, based on the set values of the correction pattern and the correction level, the CPU 102 controls so as to change a control level voltage VREF (corresponding to a "predetermined intensity level" of the present invention), which forms the standard in controlling the intensity of a light beam, and outputs to the lighting control section 42. That is, the correction control section 40 has the function of intensity level changing means of the present invention.

The memory 104 stores therein various parameter setting values for controlling driving of the timing-setting ASIC 106 for each of the set values of the correction pattern and the correction level (see Table 1 shown below).

The timing-setting ASIC 106 is connected to the SOS sensor 72 and the result of detection by the SOS signal (that is, an SOS signal) is directly inputted thereto. The timing-setting ASIC 106 generates, based on the parameter setting values stored in the memory 104, various signals (reset signal SCRST, clock signal SCCLK, up/down signal SCUD: described later in detail) for correcting the intensity of a light beam in an image region for each one scan of the light beam by the light scanning device 20 in synchronous with the SOS signal, and outputs the various signals to the lighting control section 42.

Detailed Structure of Lighting Control Section

Next, the structure of the lighting control section 42 will be described in detail with reference to FIG. 5.

Figure 5:
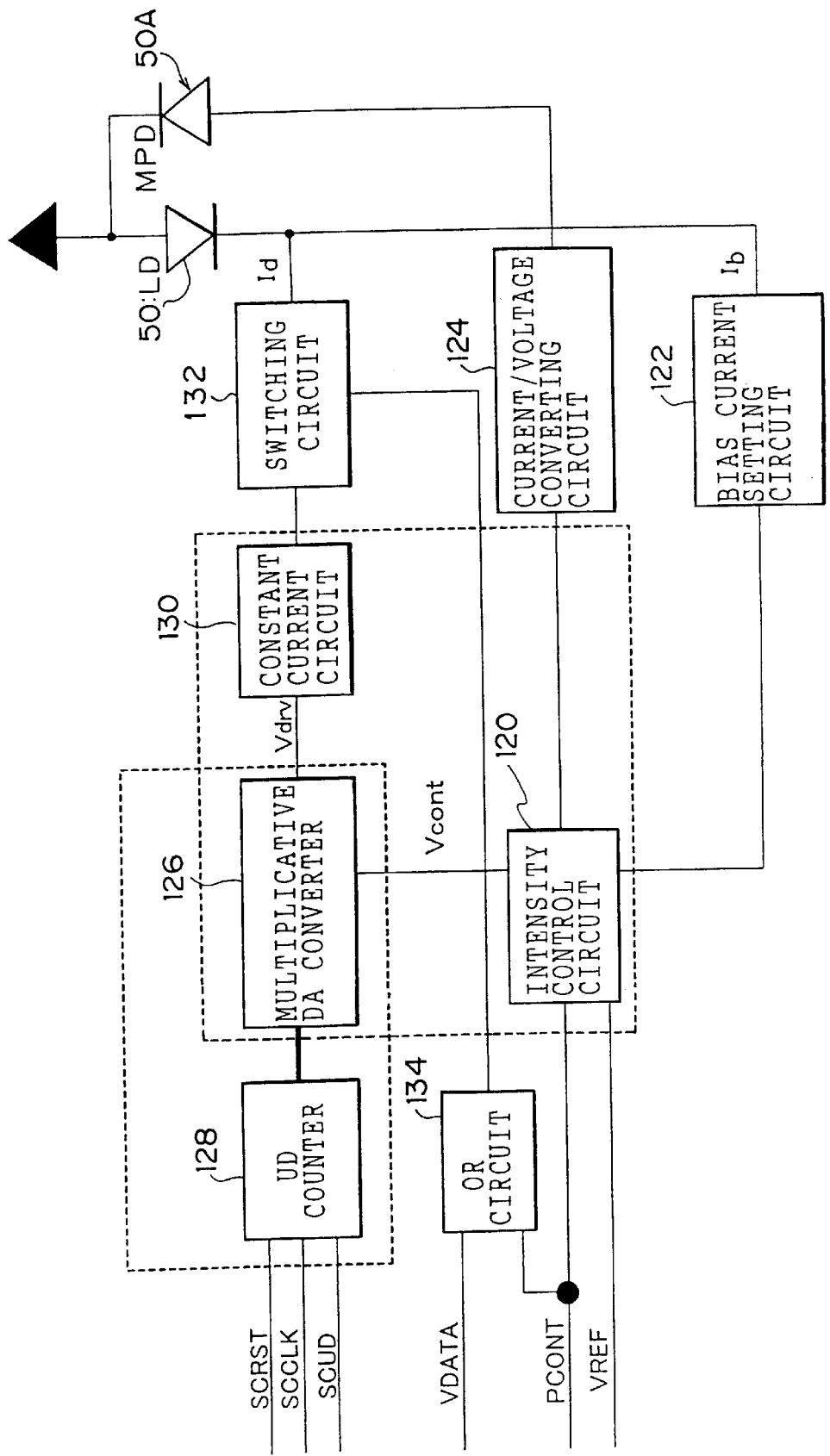
FIG. 5 is a block diagram showing a detailed structure of a lighting control section according to the first embodiment.

As shown in FIG. 5, the lighting control section 42 is structured which includes an intensity control circuit 120, a bias current setting circuit 122, a current/voltage converting circuit 124, a multiplicative DA converter 126, an up/down (UD) counter 128, a constant current circuit 130, a switching circuit 132, and an OR circuit 134.

Inputted to the intensity control circuit 120 are a control level voltage VREF from the correction control section 40, and an intensity control timing signal PCONT which indicates an intensity control timing from the timing setting section (not shown). Further, the intensity control circuit 120 is connected to the bias current setting circuit 122, the current/voltage converting circuit 124, and the multiplicative DA converter 126.

The bias current setting circuit 122 is connected to the LD 50 and supplies, to the LD 50, bias current Ib on such a level as not to allow emission of light from the LD 50. The intensity control circuit 120 effects on-off control for driving of the bias current setting circuit 122, and during an image forming operation of the image forming apparatus 10, previously supplies bias current Ib to the LD 50.

The current/voltage converting circuit 124 is connected to a monitor photodiode (MPD) 50 A comprised of a PIN photodiode and provided within a package of the LD 50. The MPD 50 A is generally provided in an LD package, and detects light emitted from a back end of a waveguide channel within the LD 50 (a so-called back beam) and outputs current corresponding to the intensity of the received light beam (hereinafter referred to as a "monitor intensity"). The current/voltage converting circuit 124 converts the current from the MPD 50A to voltage and outputs the same to the intensity control circuit 120.

The intensity control circuit 120 generates, based on the voltage based on the monitor intensity from the current/voltage converting circuit 124 (hereinafter referred to as "monitor voltage"), and a control level voltage VREF, control voltage Vcont and outputs the same to the multiplicative DA converter 126. Further, the intensity control circuit 120 effects, based on the intensity control timing signal PCONT, switching between a sample state (setting control of Vcont value) and a hold state (holding of the set Vcont value).

The multiplicative DA converter 126 is connected to the UD counter 128 and also to the constant current circuit 130. Inputted to the UD counter 128 are a reset signal SCRST, a clock signal SCCLK, and an up/down signal SCUD from the correction control section 40. The UD counter 128 counts the number of clocks of the clock signal SCCLK and outputs the count value, as an 8-bit digital signal, to the multiplicative DA converter 126. Further, the UD counter 128 resets the count value based on the reset signal SCRST, and based on the up/down signal SCUD, effects switching between up counting and down counting.

The multiplicative DA converter 126 carried out multiplication of the control voltage Vcont (analog value) from the intensity control circuit 120, and the count value (8-bit digital signal) from the UD counter 128 to generate the driving voltage Vdrv (analog value), and outputs the same to the constant current circuit 130.

In the present embodiment, when the count value inputted from the UD counter 128 is changed to a value from 0 to 255, the control voltage Vcont inputted from the intensity control circuit 120 is changed in a range from 75 to 125% and outputted as the driving voltage Vdrv. Further, when the count value of the UD counter 128 is 128, the control voltage Vcont to be inputted, and the driving voltage Vdrv to be outputted are set at the same voltage (i.e., 100%). The UD counter 128 is loaded with the value 128 in a reset state.

The constant current circuit 130 is connected to the LD 50 via the switching circuit 132. The constant current circuit 130 converts the driving voltage Vdrv to the driving current Id and supplies the same to the LD 50 via the switching circuit 132.

The switching circuit 132 is connected to the OR circuit 134. Inputted from the timing setting section (not shown) to the OR circuit 134 are an intensity control timing signal PCONT and a lighting data VDATA of the LD 50. The OR circuit 134 implements an OR operation of the intensity control timing signal PCONT and the lighting data VDATA, and outputs the result of the operation to the switching circuit 132.

In the switching circuit 132, the output signal from the OR circuit 134 is made into a switching signal and an on-off state in supply of the driving current Id to the LD 50 is switched. That is, based on the intensity control timing signal PCONT or the lighting data VDATA, lighting of the LD 50 is set in an on/off state.

As described above, in the lighting control section 42, the intensity control means of the present invention is formed by the intensity control circuit 120, the multiplicative DA converter 126, and the constant current circuit 130. Due to the value of driving current Id for the LD 50 provided in the light scanning device 20 being controlled based on the predetermined timing, the intensity of the light beam emitted from the LD 50 is controlled, and a controlled fixed intensity is held in the image region. Further, the multiplicative DA converter 126 and the U/D counter 128 form a correction means of the present invention, and based on an amount of correction outputted from the correction control section 40, the driving current Id is corrected in the image region, thereby making it possible to correct the ratio in the intensity of light beams in the main scanning direction. That is, correction of density unevenness in the main scanning direction is carried out by correcting the intensity of light beams in the main scanning direction.

Operation

Next, a description will be given of the operation of the present embodiment. First, the operation of the lighting control section 42 will be described with reference to the timing chart shown in FIG. 6.

In the light scanning device 20, a little before a light beam is made incident on the SOS sensor 72, the lighting data VDATA is made high (H) so that the LD 50 is turned on (advance lighting of SOS). Specifically, when the lighting data VDATA becomes H, the switching circuit 132 is turned on and the driving current Id is supplied. The LD 50 is in advance supplied with a bias current Ib on such a level as not to allow emission of a laser beam, and is turned on by additionally supplying the driving current Id thereto. When a light beam is made incident on the SOS sensor 72 by lighting the LD 50, an SOS signal is outputted from the SOS sensor 72.

With the trailing edge of the SOS signal being set as the standard, a start/end timing of an image region (section A), a start/end timing for intensity control (so-called APC) (section B), and a start/end timing for lighting the LD 50 a little before a light beam is made incident on the SOS sensor 72 for acquiring a subsequent SOS signal (advance lighting of SOS) (section C) are determined by a timing control section (not shown). Based on the determined timing, H/L of each signal is changed.

Figure 6:
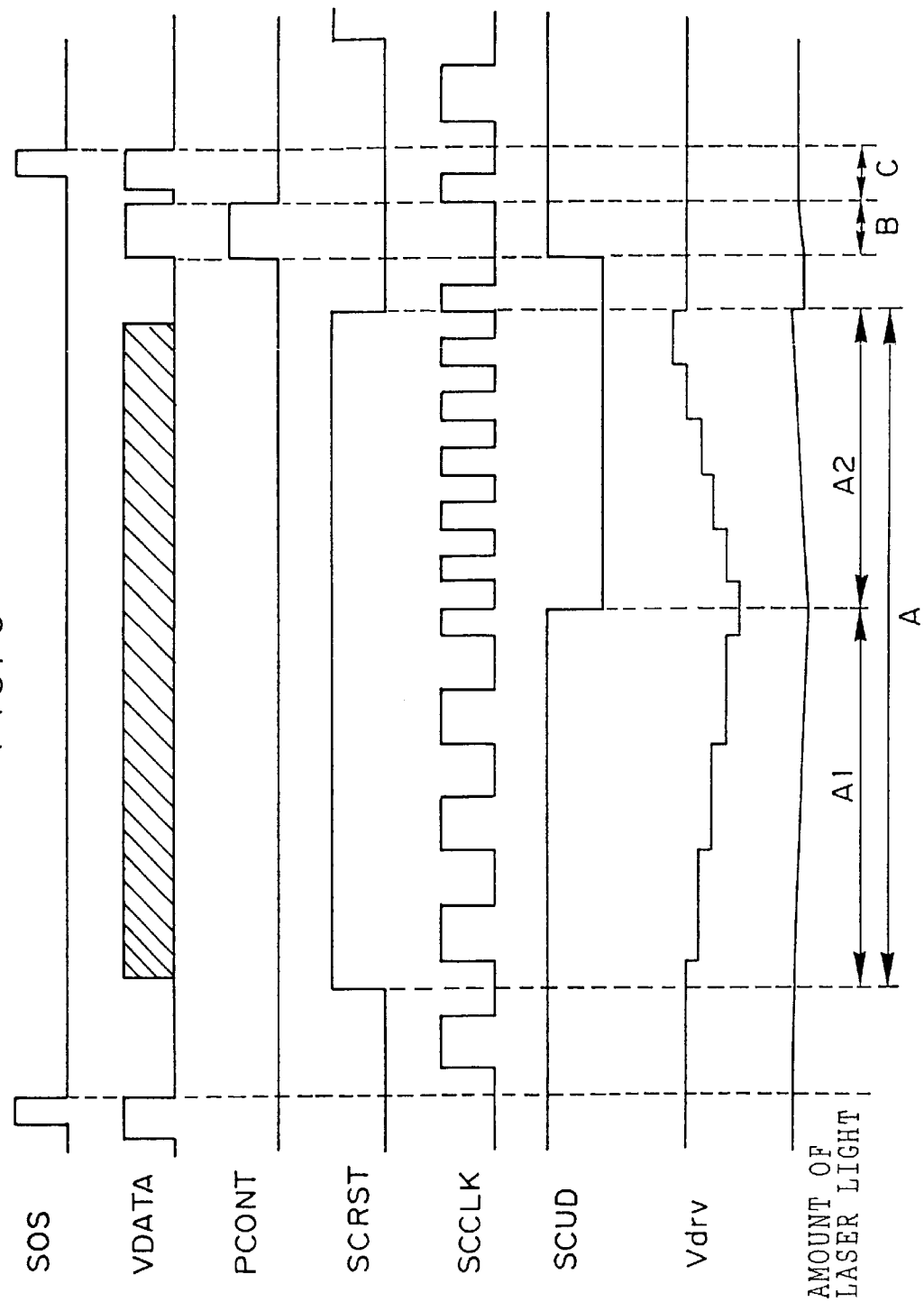
FIG. 6 is a timing chart of various signals, which is used for illustrating the lighting control section.

As shown in FIG. 6, in other regions than the image region (section A), the reset signal SCRST is made low (L), and the UD counter 128 is placed in a reset state, that is, the output of the UD counter 128 is loaded with 128. Accordingly, the control voltage Vcont signal is made equal to the driving voltage Vdrv (Vcont=Vdrv). During the intensity control (section B) or at the time of the advance lighting of SOS (section C), correction of the intensity of light beams is not carried out.

After termination of the image region (the operation in the image region will be described later), when the start timing for the intensity control comes, the intensity control timing signal PCONT becomes H and the lighting data VDATA also becomes H.

When the intensity control timing signal PCONT becomes H, the operation of controlling the intensity of a light beam by the intensity control circuit 120 is started and the control voltage Vcont is changed from a hold state to a sample state. Further, the switching circuit 132 is turned on so that the driving current Id is supplied to the LD 50 based on the driving voltage Vdrv, and the LD 50 emits a light beam at the intensity corresponding to a current with the driving current Id being additionally supplied to the bias current Ib supplied in advance.

At this time, a part of light beams emitted from the LD 50 is received by the MPD 50A, and a current corresponding to the intensity of the received light beam is inputted to the current/voltage converting circuit 124 and further converted to a monitor voltage. The intensity control circuit 120 compares the monitor voltage and the control level voltage VREF. If the monitor voltage is greater than the control level voltage VREF, the intensity control circuit 120 controls so as to decrease an output level of the control voltage Vcont. If the monitor voltage is smaller than the control level voltage VREF, the intensity control circuit 120 controls so as to increase the output level of the control voltage Vcont. During the control period, the reset signal SCRST is made L, and therefore, the driving voltage Vdrv is made equal to the control voltage Vcont (Vdrv=Vcont). As a result, the driving current Id can be controlled. Due to the driving current Id being controlled, the intensity of the light beam from the LD 50 can be controlled.

After passing of the predetermined timing, when the end timing for the intensity control comes, the intensity control timing signal PCONT becomes L. As a result, and the control voltage Vcont changes from the sample state to the hold state, and the intensity control of light beams ends (section C).

The foregoing was described in a case in which the bias current Ib is a fixed current, but the intensity may also be controlled at a predetermined timing. For example, with the intensity control timing signal PCONT being made into a 2-bit signal, switching between the setting of bias current and the setting of driving current can be effected.

Next, a description will be given of the operation in the image region. When the start timing of the image region comes, input of the lighting data VDATA based on image data is started. In accordance with the lighting data VDATA, the switching circuit 132 is turned on or off. As a result, lighting of the LD 50 is controlled based on image data, and light beams based on the image data are emitted.

Further, when the start timing of the image region comes, the reset signal SCRST becomes H and a counting operation is carried out by the UD counter 128 at the leading timing of the clock signal SCCLK. In the present embodiment, when the up/down signal SCUD is H, the UD counter 128 carries out a down counting operation. When the up/down signal is L, the UD counter 128 carries out an up counting operation.

The above-described operation of the UD counter 128 will be described hereinafter with reference to the timing chart shown in FIG. 6. In the section A1, the up/down signal SCUD is H, and therefore, the UD counter 128 effects down counting at the leading timing of the clock signal SCCLK, and the count value decreases. Accompanied with the decrease of the count value, the driving voltage Vdrv outputted from the multiplicative DA converter 126 decreases and the driving current Id to be supplied to the LD 50 also decreases. As a result, the intensity of light beams emitted from the LD 50 gradually decreases.

Subsequently, in the section A2, the up/down signal SCUD is made L and the UD counter 128 effects the up counting operation. Accordingly, the count value increases at the leading timing of the clock signal SCCLK and the driving voltage Vdrv outputted from the multiplicative DA converter 126 increases. Due to the increase of the driving voltage Vdrv, the driving current Id increases in contrast with the section A1. Therefore, the intensity of light beams gradually increases. At this time, the frequency of the clock signal SCCLK is higher than that in the section A1. Therefore, it can be seen that the rate of change in the driving voltage Vdrv, that is, the rate of change in the intensity of light beams becomes large.

As described above, the intensity of light beams in the image region can be corrected by a predetermined pattern within a range of one main scan in such a manner as to switch the up/down signal SCUD between H/L and change the frequency of the clock signal SCCLK.

Next, a description will be given of a correction pattern when the intensity of light beams is corrected. First, general patterns of uneven density will be described. FIG. 7 shows a general example of density unevenness occurring when a halftone image having the same density on the entire surface thereof is printed. It has been generally known that density unevenness is apt to occur in a highlight region having a density of 20 to 30%.

As shown in FIGS. 7A to 7C, in most cases, patterns of uneven density are formed, wherein density becomes lower at the rear end of the scanning direction of light beams (pattern ①), the front end thereof (pattern ②), and the both ends (pattern ③). A proper correction pattern is determined in accordance with the above-described patterns of uneven density, and uneven density is thereby corrected.

The uneven density may be determined by a user's visual observation of an output of a test sample image (hereinafter referred to as a "sample image"). Alternatively, the density of each of plural regions in the main scanning direction is measured by a sensor, and based on the measured densities, a determination may be automatically made by the image forming apparatus 10 as to whether which pattern of uneven density would have occurred. The case in which uneven density is visually observed will be hereinafter described in detail.

FIG. 8 shows the flow of the entire density correction processing when uneven density is corrected by visual observation.

As shown in FIG. 8, in the selection processing of the correction pattern, first, in step 200, a halftone image having a coverage of 20% or thereabouts is outputted as a sample image.

In the subsequent step 202, it is determined by visually observing the outputted sample image whether there is the uneven density of pattern ①. In steps 204 and 206, it is similarly determined whether there is the uneven density of pattern ② and whether there is the uneven density of pattern ③. That is, it is determined whether uneven density of the sample image is close to which pattern of uneven density shown in FIG. 7. When no density unevenness occurs, the process ends.

If there is the uneven density of pattern ①, the process proceeds to step 208. If there is the uneven density of pattern ②, the process proceeds to step 210. If there is the uneven density of pattern ③, the process proceeds to step 212. In these steps 208, 210, and 212, the correction for the intensity of light beams, which corresponds to each of the patterns of uneven density, is carried out.

Figure 9:
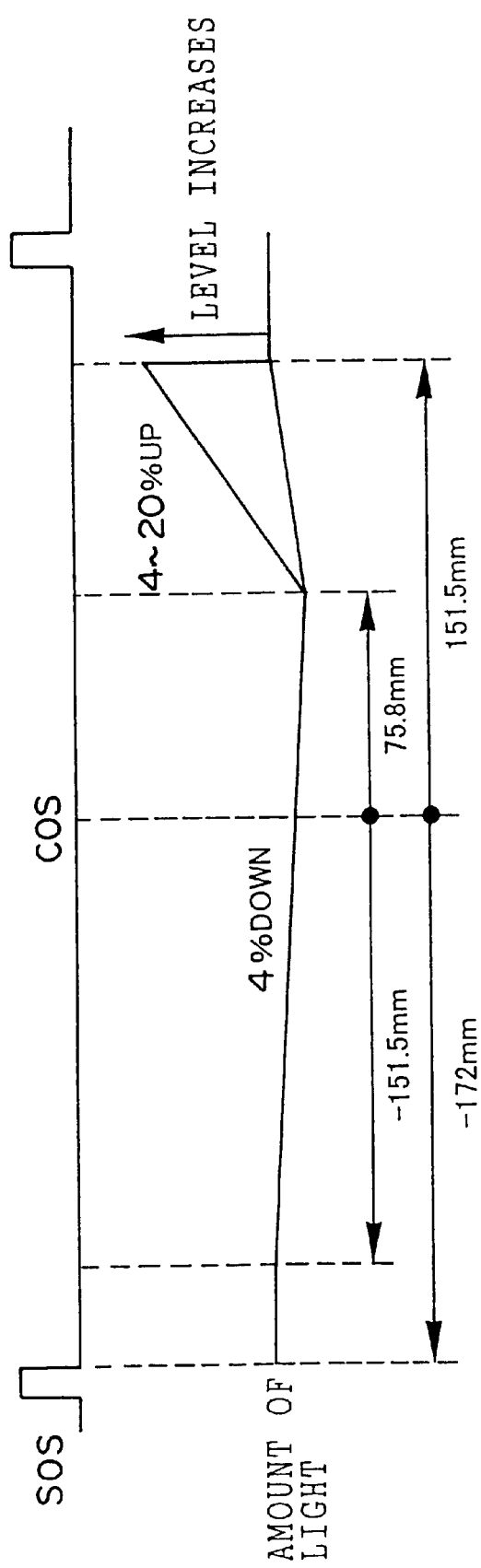
FIG. 9 is a diagram showing an adjustment pattern and an adjustment level of the intensity of light beams for correcting uneven density of the pattern ①.
Figure 10:
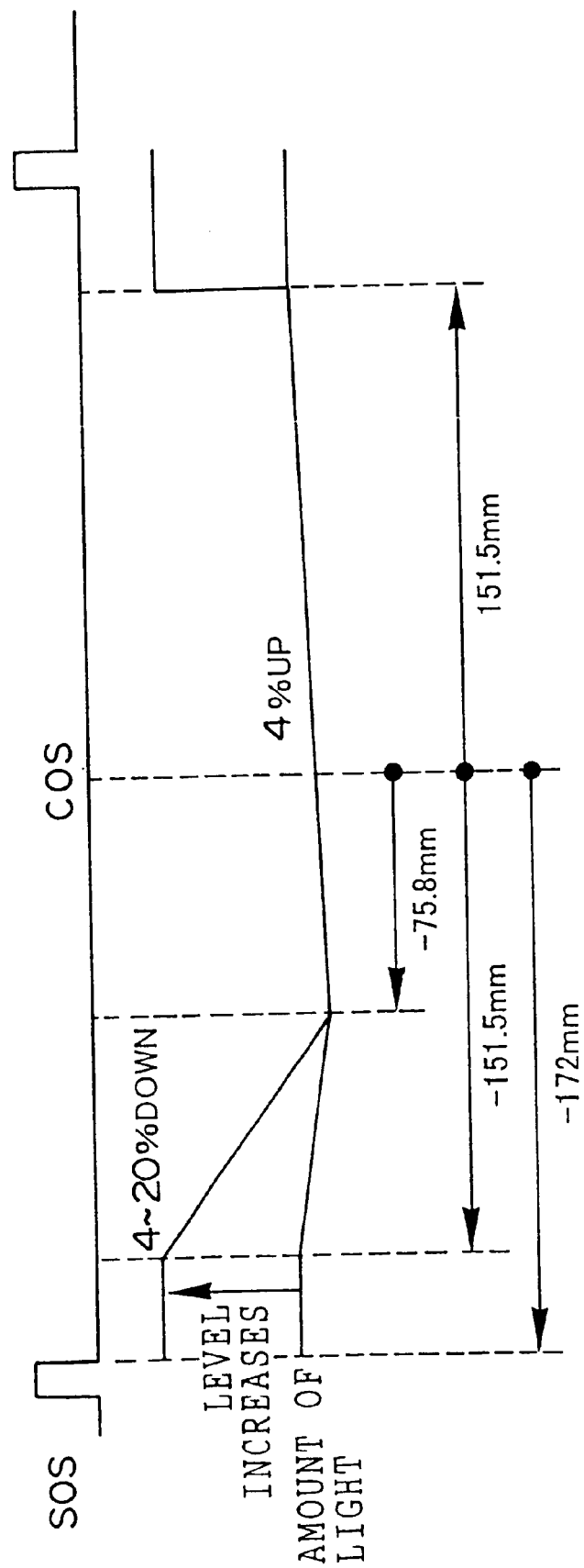
FIG. 10 is a diagram showing an adjustment pattern and an adjustment level of the intensity of light beams for correcting uneven density of the pattern ②.
Figure 11:
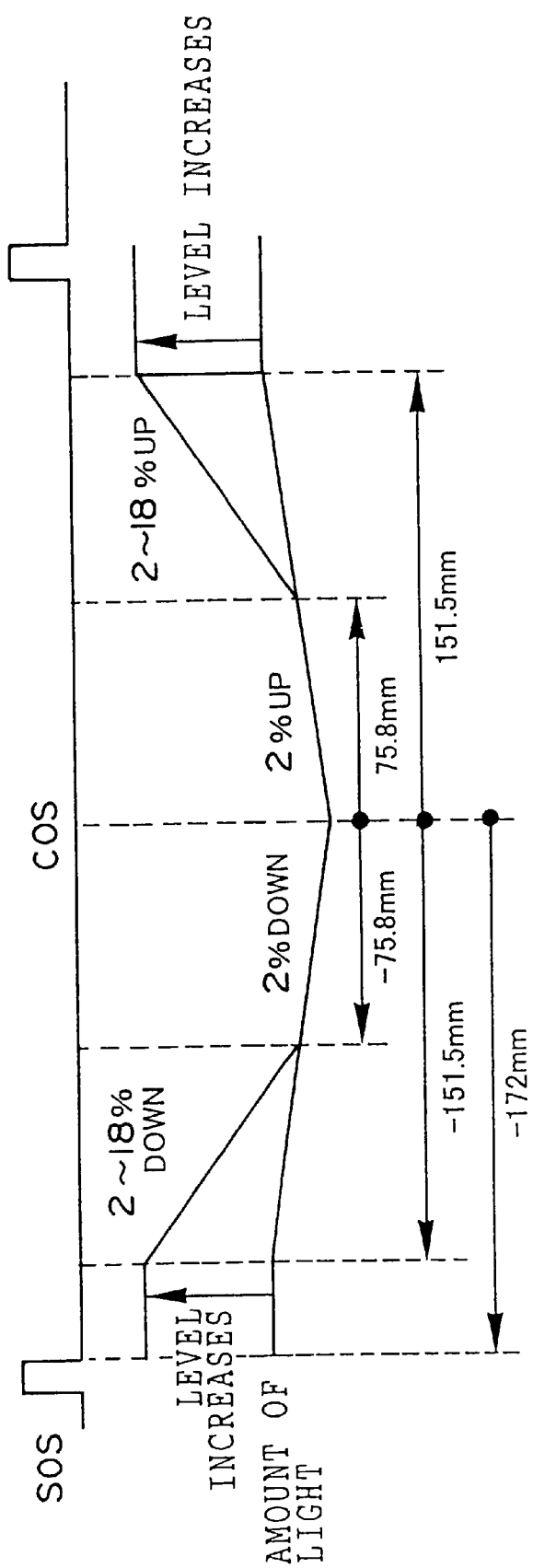
FIG. 11 is a diagram showing an adjustment pattern and an adjustment level of the intensity of light beams for correcting uneven density of the pattern ③.

Specifically, when the uneven density corresponding to the pattern ① occurs, the correction pattern shown in FIG. 9 is selected and the correction for the intensity of light beams is carried out. When the uneven density corresponding to the pattern ② occurs, the correction pattern shown in FIG. 10 is selected and the correction for the intensity of light beams is carried out. When the uneven density corresponding to the pattern ③ occurs, the correction pattern shown in FIG. 11 is selected and the correction for the intensity of light beams is carried out.

Leading timing SCCLKAP and trailing timing SCCLKNP of clock selection signal CLKSEL from a trailing edge of SOS signal Frequency of clock signal SCCLK0

Frequency of clock signal SCCLK1

Intensity of light beams at the central portion (COS) of the image region

TABLE 1

LIGHT BEAM INTENSITY ADJUSTMENT TABLE

| | | | | SCRST | | SCU | | CLKSEL | | |
| --- | --- | --- | --- | --- | --- | --- | --- | --- | --- | --- |
| SCPTN | SCLVL | SCCLK 0 | SCCLK 1 | SCRSTAP | SCRSTNP | SCUAP | SCUNP | SCCLKAP | SCCLKAP | SCLDCONT |
| 1 | 0 | 134 | 45 | 484 | 7642 | 5853 | 7642 | 5853 | 7642 | 974 |
| 1 | 1 | 134 | 30 | 484 | 7642 | 5853 | 7642 | 5853 | 7642 | 974 |
| 1 | 2 | 134 | 22 | 484 | 7642 | 5853 | 7642 | 5853 | 7642 | 974 |
| 1 | 3 | 134 | 18 | 484 | 7642 | 5853 | 7642 | 5853 | 7642 | 974 |
| 1 | 4 | 134 | 15 | 484 | 7642 | 5853 | 7642 | 5853 | 7642 | 974 |
| 1 | 5 | 134 | 13 | 484 | 7642 | 5853 | 7642 | 5853 | 7642 | 974 |
| 1 | 6 | 134 | 11 | 484 | 7642 | 5853 | 7642 | 5853 | 7642 | 974 |
| 1 | 7 | 134 | 10 | 484 | 7642 | 5853 | 7642 | 5853 | 7642 | 974 |
| 1 | 8 | 134 | 9 | 484 | 7642 | 5853 | 7642 | 5853 | 7642 | 974 |
| 2 | 0 | 45 | 134 | 484 | 7642 | 2274 | 7642 | 2274 | 7642 | 974 |
| 2 | 1 | 30 | 134 | 484 | 7642 | 2274 | 7642 | 2274 | 7642 | 954 |
| 2 | 2 | 22 | 134 | 484 | 7642 | 2274 | 7642 | 2274 | 7642 | 932 |
| 2 | 3 | 18 | 134 | 484 | 7642 | 2274 | 7642 | 2274 | 7642 | 914 |
| 2 | 4 | 15 | 134 | 484 | 7642 | 2274 | 7642 | 2274 | 7642 | 894 |
| 2 | 5 | 13 | 134 | 484 | 7642 | 2274 | 7642 | 2274 | 7642 | 876 |
| 2 | 6 | 11 | 134 | 484 | 7642 | 2274 | 7642 | 2274 | 7642 | 850 |
| 2 | 7 | 10 | 134 | 484 | 7642 | 2274 | 7642 | 2274 | 7642 | 834 |
| 2 | 8 | 9 | 134 | 484 | 7642 | 2274 | 7642 | 2274 | 7642 | 814 |
| 3 | 0 | 89 | 89 | 484 | 7642 | 4063 | 7642 | 2274 | 5853 | 960 |
| 3 | 1 | 45 | 89 | 484 | 7642 | 4063 | 7642 | 2274 | 5853 | 942 |
| 3 | 2 | 30 | 89 | 484 | 7642 | 4063 | 7642 | 2274 | 5853 | 922 |
| 3 | 3 | 22 | 89 | 484 | 7642 | 4063 | 7642 | 2274 | 5853 | 900 |
| 3 | 4 | 18 | 89 | 484 | 7642 | 4063 | 7642 | 2274 | 5853 | 882 |
| 3 | 5 | 15 | 89 | 484 | 7642 | 4063 | 7642 | 2274 | 5853 | 862 |
| 3 | 6 | 13 | 89 | 484 | 7642 | 4063 | 7642 | 2274 | 5853 | 844 |
| 3 | 7 | 11 | 89 | 484 | 7642 | 4063 | 7642 | 2274 | 5853 | 818 |
| 3 | 8 | 10 | 89 | 484 | 7642 | 4063 | 7642 | 2274 | 5853 | 802 |

Figure 12:
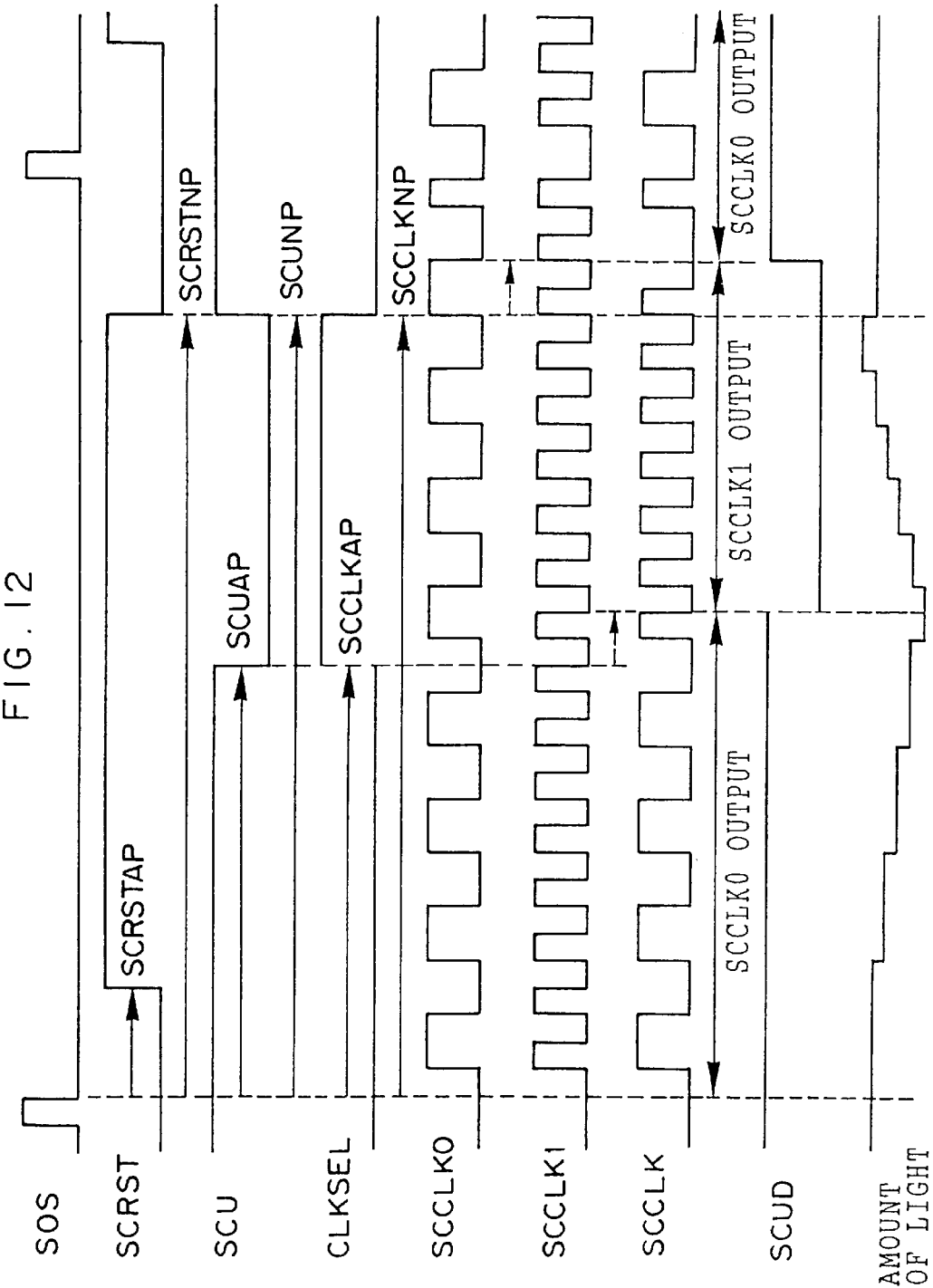
FIG. 12 is a timing chart of various signals, which is used for illustrating the operation of a correction control section (a timing-setting ASIC).

Next, control processing carried out in the correction control section 40 for correction of the intensity will be described in detail. FIG. 12 shows the timing chart which indicates the timing for setting the reset signal SCRST, the clock signal SCCLK, and the up/down signal SCUD, which signals are set by driving the timing-setting ASIC 106.

As can be seen from FIG. 12, the reset signal SCRST, the clock signal SCCLK, and the up/down signal SCUD are set from an SOS signal, an up signal SCU which indicates the period of the up counting operation, a clock signal SCCLK0 for down counting, a clock signal SCCLK1 for up counting, and a clock selection signal CLKSEL which indicates selection of any one of the clock signal SCCLK0 and the clock signal SCCLK1.

The correction control section 40 previously holds, in the memory 104, the following parameter setting values for each of the correction pattern (SCPTN) and the correction level (SCLVL) for setting of the above-described signals, and concrete numerical values are indicated in Table 1.

Leading timing SCRSTAP and trailing timing SCRSTNP of reset signal SCRST from a trailing edge of SOS signal Trailing timing SCUAP and leading timing SCUNP of up signal SCU from a trailing edge of SOS signal In the correction control section 40, parameter setting values corresponding to the correction pattern and the correction level are read out from the memory 104, and the timing-setting ASIC 106 is driven as shown in the timing chart of FIG. 12, thereby resulting in generation of the reset signal SCRST, the clock signal SCCLK, and the up/down signal SCUD.

Figure 13:
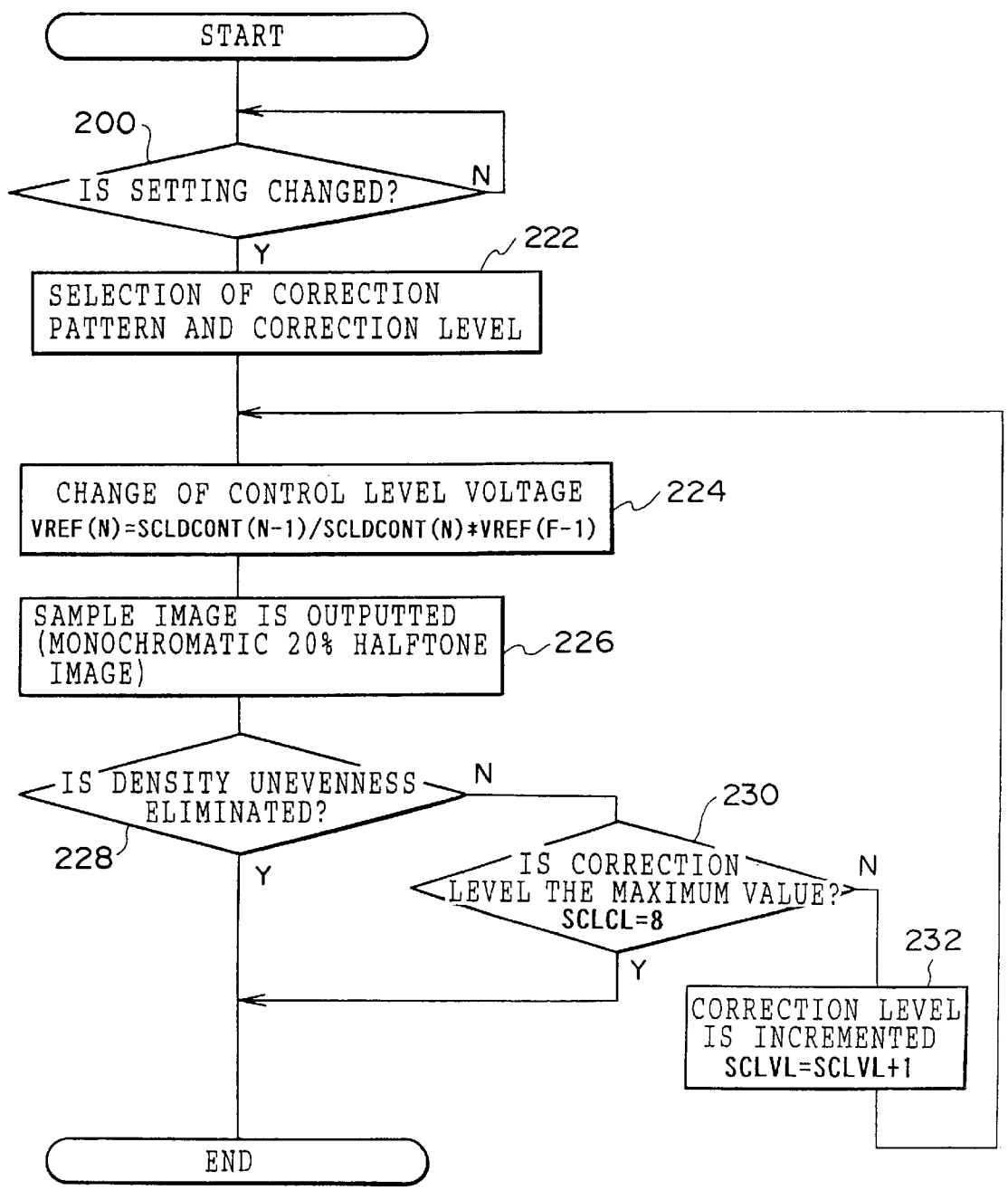
FIG. 13 is a flow chart showing one example of a control routine executed in the correction control section.

FIG. 13 shows an example of the control routine executed in the correction control section 40.

When it is determined by the user's visual observation that uneven density has occurred, based on the result of the determination, the first switch 100A of the user interface 100 is operated to allow selection and setting of the pattern of uneven density and the second switch 100B is operated to allow selection and setting of the level (0 to 8). In the following concrete example, uneven density corresponding to the pattern ② in FIG. 7 occurs, and a case in which the pattern ② is selected by the first switch 100A and 0 is set by the second switch 100B will be described below.

As shown in FIG. 13, in the correction control section 40, the process is started after setting of at least one of the first switch 100A and the second switch 100B is changed by the user (step 220).

When setting of at least one of the first switch and the second switch is changed by the user, the process proceeds to step 222, in which based on the result of the change, the correction pattern and the correction level are selected. In this case, referring to Table 1, 2 is selected for SCPTN and 0 is selected for SCLVL. In the subsequent step 224, the control level voltage VREF is changed.

Specifically, when the uneven density of pattern ②  is corrected, as shown in FIG. 10, the up/down signal SCUD is made H and the frequency of the clock signal SCCLK (the clock signal SCCLK0) is set to be high to the point of the first one fourth of the image region. As a result, the intensity of light beams is rapidly decreased. Thereafter, the up/down signal SCUD is made L, and the frequency of the clock signal SCCLK (the clock signal SCCLK1) is decreased, thereby allowing the intensity of light beams to gradually increase.

Accordingly, the intensity of light beams in the vicinity of the substantially center of the image region becomes lower than that at the time that the intensity control ends, and the density of the region near the substantially center of the image region, which has the highest visibility, decreases. As a result, the image quality deteriorates. More specifically, in a general image forming apparatus, various members are adjusted so that the density at the central portion of an image becomes a predetermined density. When the density at an end of the image is low, a relative density difference can be eliminated if only the density of the central portion is made low. However, in a case in which a color image is processed by the image forming apparatus 10, if the density at the central portion of the image is changed, the difference in the density between images of various colors occurs and ununiformity of color tone is caused. As a result, the image quality deteriorates.

In order to prevent the above-described problem, it is necessary that the intensity of light beams in the vicinity of the substantially central portion of the image be made equal before and after setting of the amount of correction is changed (that is, before and after the correction pattern and the correction level are set in step 222).

For example, when before the change, the first switch 100A is set at 3 and the second switch 100B is set at 0, provided that the intensity of light beams after the intensity control ends be 1000, the intensity of light beams substantially at the central portion of the image at the time of correcting the intensity becomes 960 (see SCLDCONT in Table 1). Subsequently, in order that the uneven density of pattern ② be corrected, when the first switch 100A is set at 2 and the second switch 100B is set at 0, the intensity of light beams substantially at the central portion becomes 974 (see SCLDCONT in Table 1). In this case, the intensity of light beams substantially at the central portion before and after the change, becomes 1.015 times (that is, 974/960=1.015). Therefore, in order to prevent variation in the intensity of light beams substantially at the central portion before and after the change, it suffices that the value of the control level voltage VREF be increased by 1/1.015 times. This is given by the following general expression:

VREF(N)=SCLDCONT(N−1)/SCLDCONT(N)*VREF(N−1)   (1)

wherein, VREF(N) represents the control level voltage VREF after the change; VREF(N−1) represents the control level voltage VREF before the change; SCLDCONT(N) represents SCLDCONT after the change; and SCLDCONT (N−1) represents SCLDCONT before the change.

In the foregoing, there was described, as an example, a case in which the control level voltage VREF is controlled so that the intensity of light beams substantially at the central portion of the image region having the highest visibility becomes substantially equal before and after setting of the amount of correction is changed. However, the present invention is not limited to the same. The position at which the intensity of light beams is made equal by controlling the control level voltage VREF before and after setting of the amount of correction is changed, may not necessarily be the substantially central portion of the image region and may also be a predetermined position within the range of one main scan.

Further, the control level voltage VREF may be controlled so that an average value of the intensity of light beams in the main scanning direction becomes substantially equal before and after the setting of the amount of correction is changed. In this case as well, an effect of preventing occurrence of ununiform color tone when a color image is processed is obtained.

Alternatively, the intensity level of light beams may finally be changed in such a manner as to use, after the end of the intensity correction, the potential surface detecting sensor 32 or the image density detecting sensors 36A and 36B and effect a control process so as to allow image density to become substantially equal to that before the change.

In the subsequent step 226, a halftone image having a coverage of 20% or thereabouts is outputted as a sample image. Specifically, control of the intensity is carried out by supplying, to the lighting control section 42, the control level voltage VREF of the value (that is, the control level voltage VREF(N)) changed in step 224. At the same time, based on the correction pattern and the correction level selected in step 222, setting values of various parameters are selected from Table 1. The timing-setting ASIC 106 is driven to allow generation of the reset signal SCRCT, the clock signal SCCLK, and the up/down signal SCUD. These signals are outputted to the lighting control section 42, and based on the signals, correction of the intensity is carried out and a sample image is outputted.

In step 228, it is determined whether uneven density is eliminated. This determination may be made by a user's visual observation (a determination as to whether uneven density is made by an input of the result of the visual observation), or may be made based on the result of detection by the image position detecting sensors 34A, 34B, and 34C, the image density detecting sensors 36A and 36B, the fixed image detecting sensor 38, and the like.

If uneven density has been eliminated, the process ends. If the uneven density corresponding to the pattern ② remains, the process proceeds to step 230, in which it is determined whether the set correction level SCLVL is the maximum value. If the correction level SCLVL is the maximum value of 8, the process ends. If the correction level is less than 8, the process proceeds to step 232, in which the value of correction level SCLVL is incremented (+1), and the process returns to step 224.

Due the above-described operations being repeatedly carried out, any of the uneven densities corresponding to the patterns ① to ③ can be corrected by implementing the same flow as described above.

It is a matter of course that the above-described operations can all be automatically effected by the CPU 102 except the determination as to the density unevenness of an image. Further, the value of correction level SCLVL is made discrete, without being incremented by +1, in accordance with the density ratio between a high density region and a low density region of the uneven density, thereby making it possible to complete correction of uneven density at an early stage.

Figure 14:
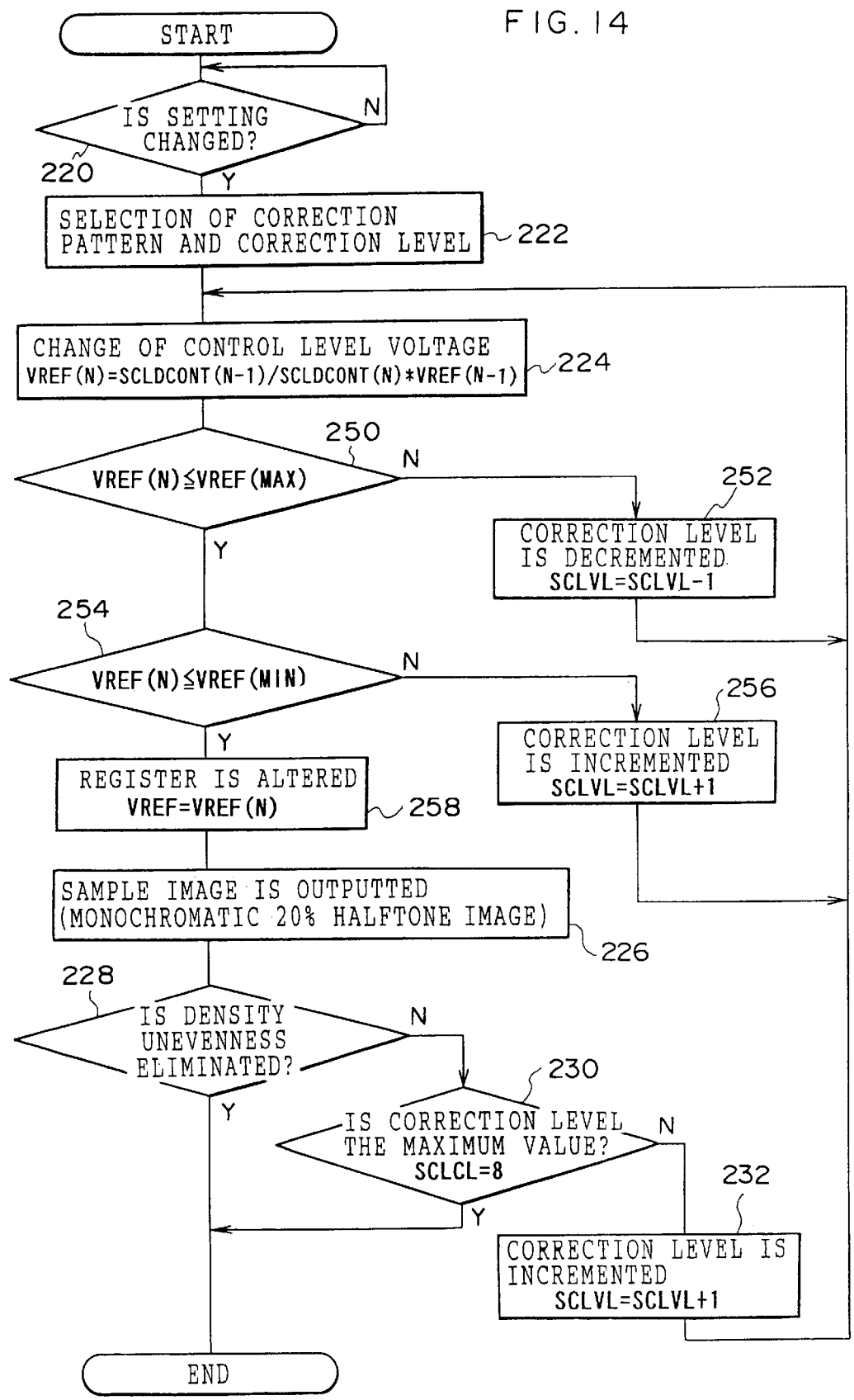
FIG. 14 is a flow chart showing another example of the control routine executed in the correction control section.

Next, with reference to FIG. 14, a description will be given of, as another example of the control routine executed by the correction control section 40, a case in which the intensity of light beams is controlled so as to be held within a predetermined range with the correction control section 40 serving as means for changing the amount of correction. In FIG. 14, the same processing as that of FIG. 13 is denoted by the same reference numeral, and a description thereof will be omitted.

As shown in FIG. 14, based on alteration of setting of at least one of the first switch and the second switch by the user, the correction pattern and the correction level are set (steps 220 and 222). The control level voltage VREF is changed (step 224), and thereafter, the process proceeds to step 250. In step 250, it is determined whether the value of the changed control level voltage VREF(N) is smaller than the predetermined maximum value VREF(MAX) which can be set. The value of VREF(MAX) is previously set at a value very close to a rated value.

For example, when the correction pattern SCPTN remains held at 2 and the correction level SCLVL is changed from 0 to 6, provided that the control level VREF(N−1) before the change is 230, the maximum value VREF(MAX) is 255, SCLDCONT(N−1) before the change is 974, and SCLDCONT(N) after the change is 850, the following expression is given:

$$VREF(N)=974/850*230=263.$$

The value of 263 exceeds the maximum value VREF(MAX) of 255. When the control level voltage VREF(N) is used, the LD 50 is lighted with the voltage exceeding the rated value. As a result, there is a possibility of the LD 50 being broken.

Accordingly, when the value of the changed control level voltage VREF(N) exceeds the maximum value VREF (MAX), the process proceeds to step 252, in which the value of correction level SCLVL is decremented (−1). Thereafter, the process returns to step 224. Namely, the correction level SCLVL is lowered by one step until the value of the changed control level voltage VREF(N) becomes the maximum value VREF(MAX) or less, thereby resulting in the following relational expression being satisfied:

$$VREF(N) \leq VREF(MAX) \qquad (2)$$

In the above-described example, when the correction level SCLVL is set at 4, the following expression is given:

$$VREF(N)=974/894*230=250.$$

As a result, the relation in the above-described expression (2) is satisfied.

When the relation in the expression (2) is satisfied, the process proceeds to step 254 in which it is determined whether the value of the changed control level voltage VREF(N) is larger than the predetermined minimum value VREF(MIN) which can be set. The value of VREF(MIN) is previously set very close to the intensity of light beams which can be detected by the SOS sensor 72.

Accordingly, if the value of the changed control level voltage VREF(N) is smaller than the minimum value VREF (MIN), there is a possibility of failure in detection of SOS being caused. In this case, the process proceeds to step 256 in which the value of correction level SCLVL is incremented (+1). Thereafter, the process returns to step 224. That is, the correction level SCLVL is increased by one step until the value of the changed control level voltage BREF(N) becomes the minimum value VREF(MIN) or more, thereby resulting in the following relational expression being satisfied:

$$VREF(N) \geq VREF(MIN) \qquad (3)$$

When the relation in the expression (3) is satisfied, the process proceeds to step 258 in which alteration of the value of VREF is written in a register. Thereafter, the process proceeds to step 226 and the subsequent processing is carried out in the same way as that of FIG. 13.

In a case in which it can be previously expected that the intensity of a light output from the LD 50 exceeds a predetermined range, it is possible to avoid a state in which the control level voltage VREF is set at an improper value which may cause damage (failure) to the LD 50 or failure in detection of SOS, by changing the correction level to allow starting of light emission at the intensity within the predetermined range. That is, the proper control level voltage VREF is set, and therefore, occurrence of deficiencies in the operation of the image forming apparatus 10 can be prevented.

To sum up, occurrence of density unevenness is determined from an image formed on an image recording medium such as the paper 28 or the intermediate transfer material belt 14, the correction pattern and the correction level are set from the pattern of density unevenness (i.e., setting of the amount of correction), and the intensity of light beams within an image region is corrected for each one scan of light beams and within the range of one main scan. As a result, any density unevenness caused by not only ununiform irradiation, but also other factors can be eliminated together.

Further, in the foregoing, due to the control level voltage VREF being changed in accordance with the amount of correction for the intensity correction, a change in the intensity, i.e., a change in the density substantially at the central portion of the image before and after the intensity correction (before and after the amount of correction is changed) is prevented. As a result, the intensity correction can be carried out by preventing occurrence of ununiform color tone in a color image to be formed.

Moreover, in the foregoing, in a case in which the control level voltage VREF corresponding to the amount of correction for the intensity correction is calculated, if the calculated control level voltage VREF is not in the predetermined range, the amount of correction is changed so that the control level voltage VREF is reliably held within the predetermined range. As a result, it is possible to prevent the LD 50 from being damaged in a state of being used over the rated value, or to prevent a failure in detection of SOS.

Alternatively, in a case in which the correction control section 40 is made to serve as an alarm signal outputting means and the changed control level voltage VREF(N) is not in the predetermined range (that is, when the decision of step 250 or step 254 in FIG. 14 is a negative), a warning may be given in such a manner that the value of the correction level SCLVL is changed and an alarm signal indicating that an abnormal value has been set, is generated by the CPU 102 and outputted from the correction control section 40. As a result, a warning can be given to a user in such a manner that, for example, an alarm signal is outputted to the user interface 100 and an alarm message is displayed on the user interface 100. Further, the operation of the image forming apparatus can be stopped by outputting to a control SW (not shown). When there is a possibility that the LD 50 may emit light exceeding the rated value, it is possible that information that an abnormal state in the image forming apparatus 10 occurs, is given to the user or the control SW (not shown) by sending an alarm signal before emission of light.

Normally, there is no possibility that control level voltage VREF of which intensity becomes the rated value or greater, be set unless deficiencies in components for the image forming process are caused. For example, only when a defective developer, photosensitive member, or transfer roll is exchanged at the time of failure, or when components are not correctly mounted, the density at an end of the image region remarkably decreases, and the changed control level voltage BREF(N) is set at a value outside the predetermined range. At this time, it becomes possible to perform confirmation of exchange parts or confirmation of a mounted state by giving a notice about an abnormal state of the image forming apparatus 10.

In the foregoing, the first switch 100A for selecting any one of the predetermined correction patterns in accordance with uneven density when uneven density is corrected by a user's visually observation of a sample image, and the second switch 100B for selecting the correction level in a stepwise manner are provided. Accordingly, the user selects the correction pattern and the correction level for the image forming apparatus 10 only by operating the first switch 100A and the second switch 100B based on the visually observed uneven density, and operates the image forming apparatus to carry out the intensity correction for eliminating the uneven density. As a result, an image of high quality can be obtained.

In the foregoing, there was described, as an example, the case in which the plurality of correction patterns and correction levels, having the different configurations as shown in FIGS. 9 to 11, are prepared corresponding to the patterns of uneven density ①, ②, and ③ in FIG. 7 (the parameter setting values corresponding to the correction patterns and the correction levels are stored in the memory 104 as shown in Table 1), and the user selects the uneven density and the level thereof by operating the first switch 100A and the second switch 100B, and in the image forming apparatus 10, the correction pattern and the correction level are set based on the result of the selection, and the amount of correction (the property in one main scan region) is determined. However, the present invention is not limited to the same.

Figure 15:
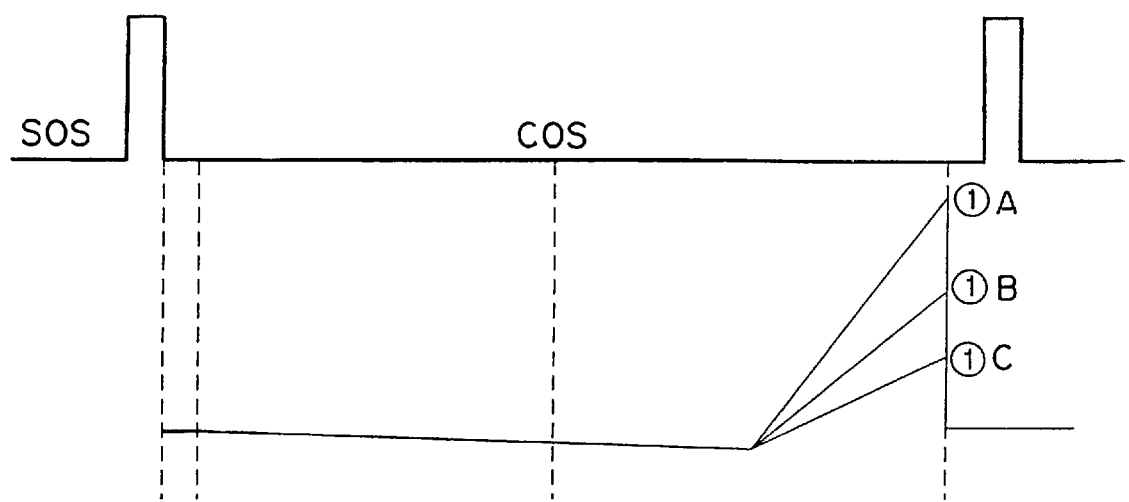
FIG. 15 is a diagram showing an adjustment pattern which varies depending on an adjustment level (inclination).

As shown in FIG. 15, so long as different correction patterns (patterns ①A, ①B, and ①C) are obtained by changing the correction level (inclination) in the same pattern, the amount of correction can be determined only by setting the correction pattern and the processing can be simplified.

At this time, as shown in FIGS. 16A to 16C, so long as the patterns 1A, 1B, and 1C which are different with the levels in the same pattern of uneven density can be selected by the first switch 100A, the second switch 100B can be omitted and reduction of the user's operation can be achieved.

Further, in the foregoing, the pattern of uneven density and the level thereof are selected by the user's operation of the first switch 100A and the second switch 100B, and the correction pattern and the correction level are set based on the result of the selection in the image forming apparatus 10. However, the correction pattern and the correction level may also be selected by the user.

Moreover, in the foregoing, there was described the case in which occurrence of uneven density is visually observed. However, occurrence of uneven density can also be observed by automatically measuring densities of plural regions in the main scanning direction using a sensor.

For example, a plurality of density sensors may be arranged within the image forming apparatus 10 in the main scanning direction at positions at which the density of a toner image formed on the photosensitive member 16, a toner image formed on the intermediate transfer material belt 14, or a toner image formed on the paper 28 can be measured.

Specifically, so long as three or more image position detecting sensors 34 (34A, 34B, and 34C) are disposed in the main scanning direction as in the present embodiment (see FIG. 2), occurrence of any of the patterns of uneven density ① to ③ can be detected by detecting the density of an image from an output peak of the image position detecting sensor 34 and comparing respective output peaks of the image position detecting sensors 34.

Further, so long as at least one of the image density detecting sensor 36 and the fixed image detecting sensor 38 is movably mounted in the main scanning direction, uneven density in the main scanning direction can be measured more accurately, and based on the result of the measurement, the correction pattern and the correction level can be arbitrarily set.

Moreover, with a scanner being installed in the image forming apparatus 10 by externally fitting, and with a sample image outputted from the image forming apparatus 10 being set in the scanner by the user, the density of the sample image may also be read by the scanner.

Highly accurate correction of density becomes possible by detecting uneven density in the main scanning direction with the sensors and determining the amount of correction based on outputs from the sensors.

Figure 17:
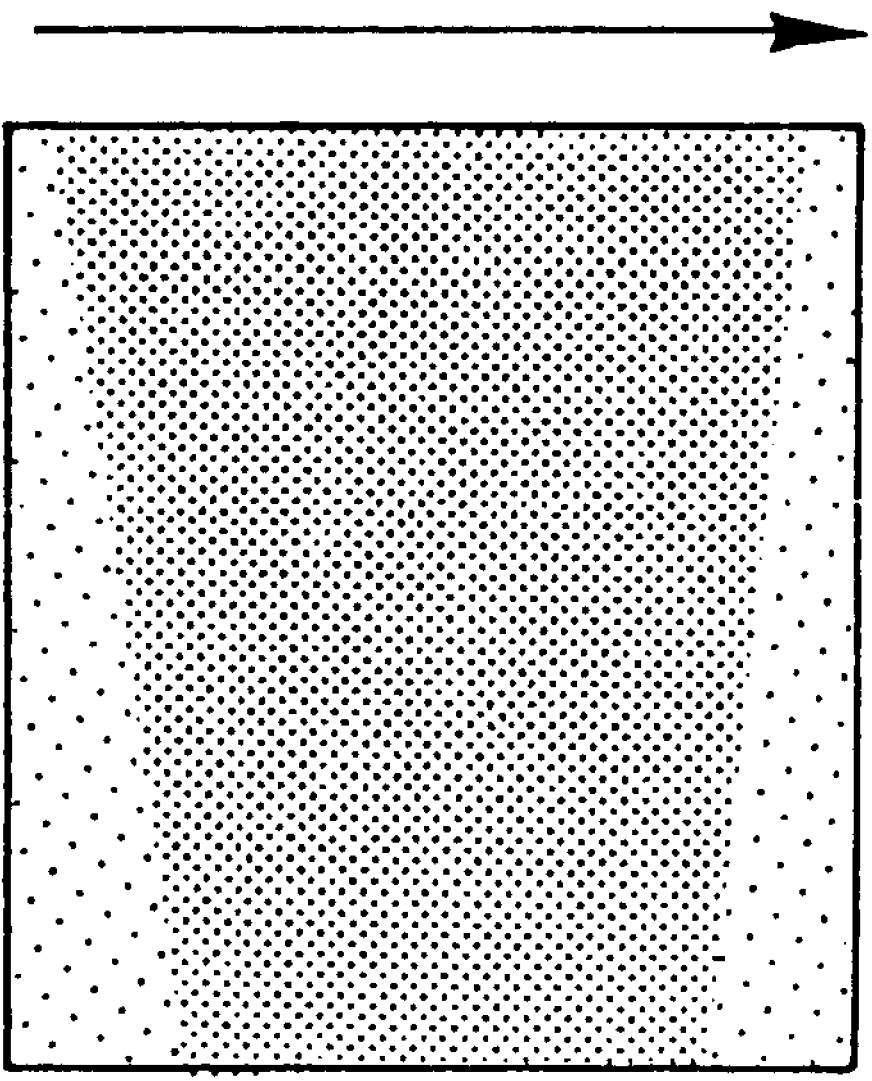
FIG. 17 is a conceptual diagram which shows an example of the pattern of uneven density when uneven density in a main scanning direction varies in one image.

In the foregoing, there was described the case in which the uneven density in the main scanning direction within one image is substantially uniform. However, the present invention can also be applied to a case in which the uneven density in the main scanning direction changes in one image as shown in FIG. 17. In this case, it suffices that the amount of correction may be changed for each one main scan continuously or gradually.

Further, the present invention can also be applied to any image forming apparatus which forms an image by scanning light beams on the photosensitive member 16. For example, the present invention can also be applied to an image forming apparatus in which an image comprised of plural lines is simultaneously written by scanning plural light beams on a photosensitive member, an image forming apparatus in which one main scan line is divided by plural light beams and scanned, and an image forming apparatus of the spray paint system in which light beams of various colors are scanned by one light scanning device.

Moreover, the present invention can also be applied not only to an image forming apparatus (of a scanning-exposure type) in which light beams are scanned and exposed as described above, but also to an image forming apparatus (of an array light source type) in which light from an array light source such as an LED array is imaged on a photosensitive member by using a SELFOC lens or the like.

An example of the image forming apparatus of an array light source type will be hereinafter described in detail as a second embodiment of the present invention.

Second Embodiment

Figure 18:
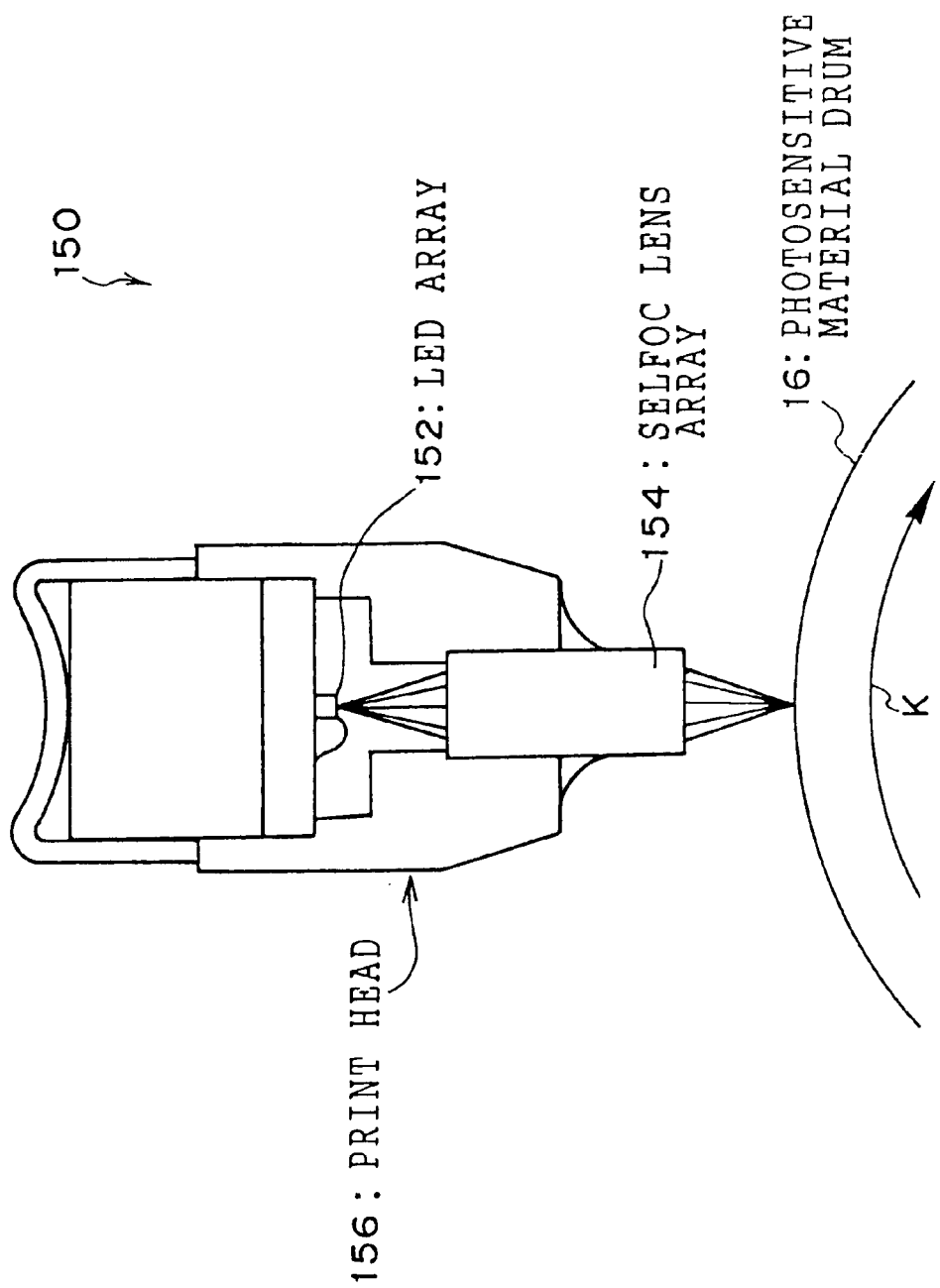
FIG. 18 is a schematic structural diagram of an image forming apparatus (of an array light source type) according to a second embodiment of the present invention.

FIG. 18 shows a schematic structure of an array light source type image forming apparatus. Note that the same members as those of the first embodiment will be denoted by the same reference numerals, and a description thereof will be omitted.

An image forming apparatus 150 shown in FIG. 18 includes a print head 156, as an exposure device, comprised of an LED array 152 serving as an array light source, in which plural light emitting elements (light emission points) are arranged in the axial direction of the photosensitive material drum 16 (i.e., the vertical direction in FIG. 1), and a SELFOC lens array 154 by which light outputted from each of the light emission elements is imaged on the surface of the photosensitive material drum 16. The print head 156 forms an image (a latent image) on the surface of the photosensitive material drum 16 rotating at a constant speed in the direction indicated by arrow K, by imaging light outputted from the LED array 152 on the SELFOC lens array 154. The structures of other portions are the same as those of the first embodiment, and a description thereof will be omitted.

Figure 19:
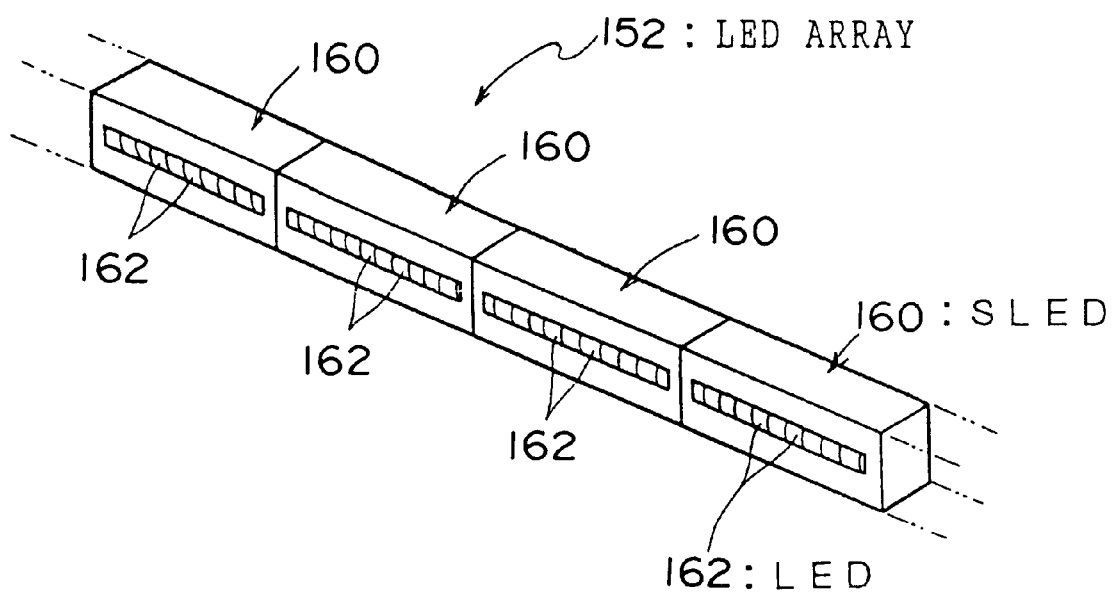
FIG. 19 is a perspective view showing the exterior of an LED array.

A description will be hereinafter given of, as an example, a case in which self-scanning light emitting diodes (SLED: self-scanning LED) 160 are used in place of the LED array 152 as shown in FIG. 19. The SLED 160 is an array light source in which a plurality of light emitting diodes (LED) 162 are arranged in one-dimensional manner and a thyristor structure is applied to a portion corresponding to a switch for selectively turning on or off the light emitting diodes 162, and the switch can be disposed, by using the thyristor structure, on a chip on which the light emitting diodes 162 are arranged.

Figure 20:
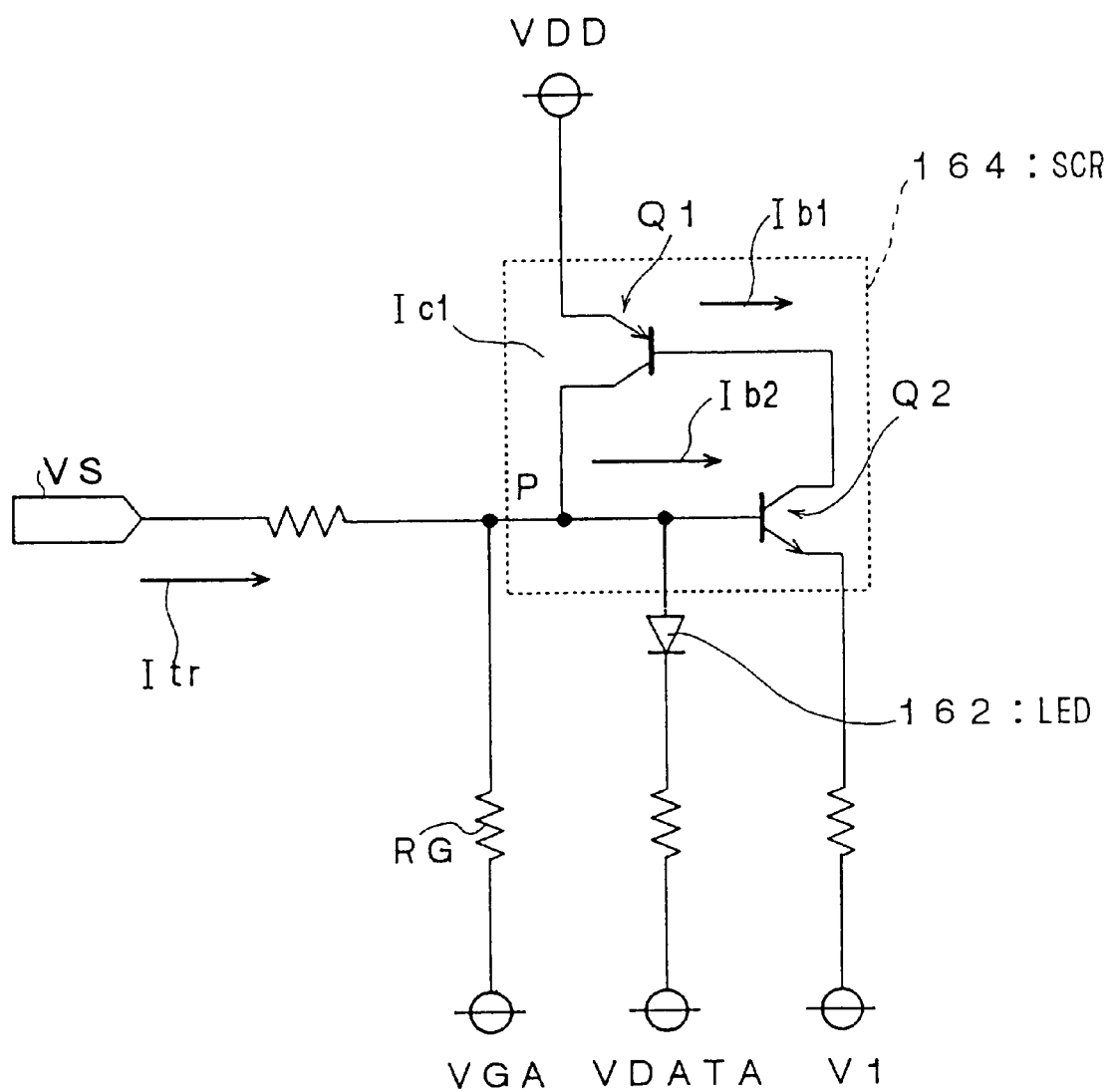
FIG. 20 is a diagram of a driving circuit of an individual LED of SLED.

FIG. 20 is a diagram for illustrating the operation of an individual light emitting diode. Driving (an on-off state) of the light emitting diode 162 is controlled by the control voltages VDD, VGA, VS, and VDATA. The control voltages are set such that VDD=5V, VGA=0V, VS=VGA, and VDATA=V=VDD in an initial state. The thyristor (SCR: semiconductor-controlled rectifier) 164 is in an off state and the light emitting diodes LED are each set in a state of emitting no light.

Provided that VS=VDD and V=VGA, base current Ib2 flows through a transistor Q2 so that the transistor Q2 is turned on and a collector current of the transistor Q2 flows. As a result, the base current Ib1 of the transistor Q1 flows and the transistor Q1 is also turned on. Further, the potential of the gate P of the thyristor (SCR) 164 becomes a value of VDD or thereabouts, and if VS=VGA, the transistors Q1 and Q2 are maintained in an on state. When in this state the relation of VDATA=VGA is set, the light emitting diodes can be turned on. Due to the relation of V=VDD being set so as to turn off the thyristor (SCR) 164, the gate P of the thyristor (SCR) 164 becomes a high impedance and a charge stored in a parasitic capacity is discharged through a high resistance RG. As a result, the transistors Q1 and Q2 are turned off.

Figure 21:
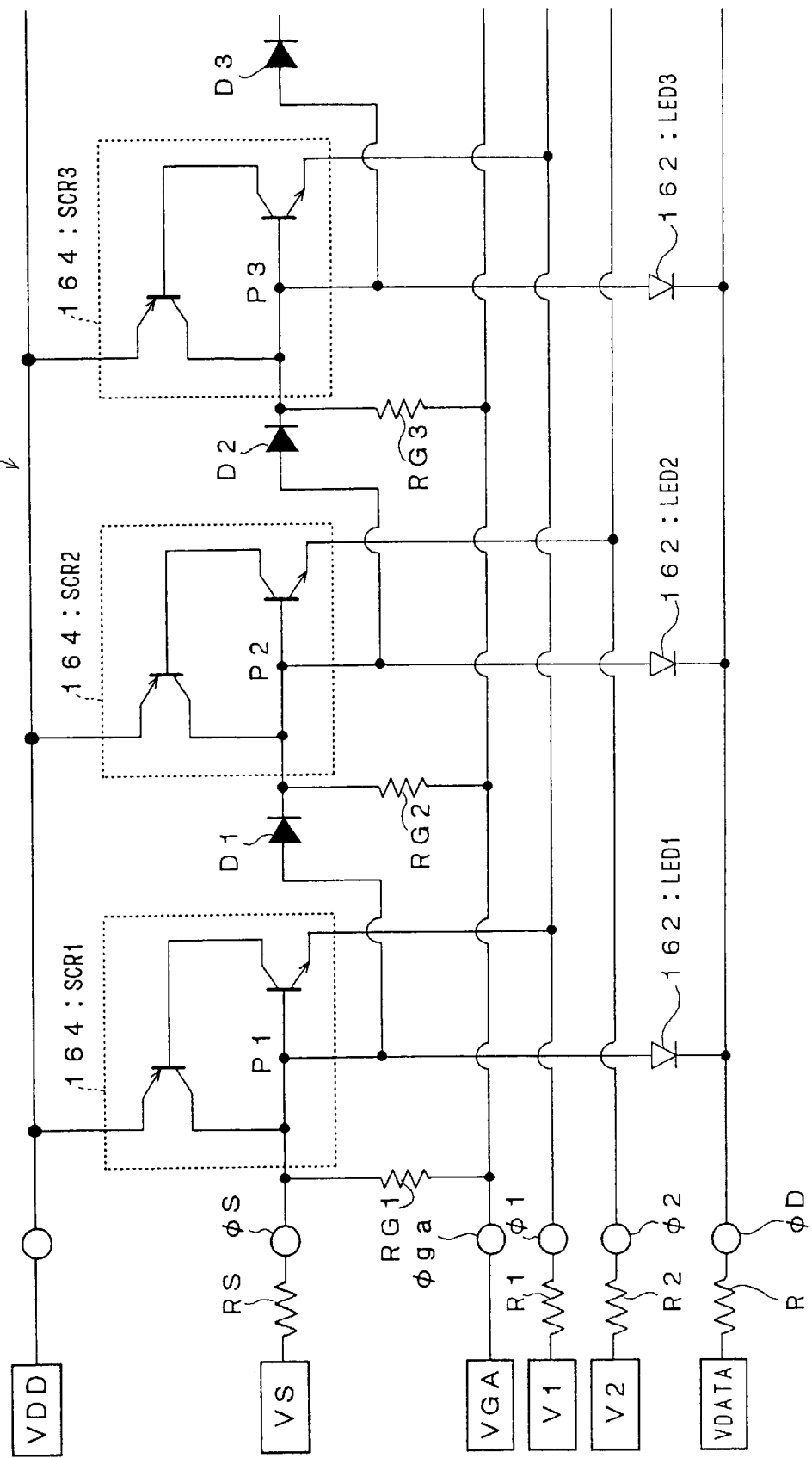
FIG. 21 is a diagram of a driving circuit of SLED.

FIG. 21 shows the structure of a driving circuit of the SLED. The operation of the SLED will be hereinafter described with reference to this figure. In FIG. 21, the first to third light emitting diodes (LED 1 to 3) are shown. The structure and operation of subsequent light emitting diodes are the same as those of the first to third light emitting diodes, and therefore, a description thereof will be omitted. The number of rows of light emitting diodes LED, naturally, is not particularly limited.

The control voltages are set such that VDD=5V, VGA= 0V, VS=VGA, V1=V2=VDATA=VDD in an initial state. The control voltages have the following functions. VDD is a power source of the driving circuit 168, VGA is a return line, VS is a trigger signal for starting self scanning, V1 is a clock signal for switching an on/off state of an odd-numbered thyristor, V2 is a clock signal for switching an on/off state of an even-numbered thyristor, and VDATA is a signal for controlling an on/off state of the light emitting diodes LED. VDD varies depending on the control level voltage VREF, the correction pattern, and the correction level in a lighting control section 170 shown in FIG. 22, which will be described later.

The gate Pn (n is an arrangement order of a corresponding light emitting diode) of each thyristor 164 (SCRn: n is an arrangement order of a corresponding light emitting diode, that is, 1 to 3 in FIG. 21) is connected via the high resistance RGn (n is an arrangement order of a corresponding light emitting diode) to a terminal Φga to allow supply of VGA. Further, a cathode terminal of an odd-numbered thyristor SCR (SCR1, SCR3) is connected to a terminal Φ1, to which V1 is supplied via a resistor R1. A cathode terminal of an even-numbered thyristor SCR (SCR2) is connected to a terminal Φ2, to which V2 is supplied via a resistor R2.

The gate Pn of each thyristor (SCRn) 164 is connected to an anode of the corresponding light emitting diode (LEDn: n is an arrangement order of the light emitting diode) 162 and also connected to a gate Pn+1 of the succeeding thyristor SCRn+1 via a diode Dn (n is an arrangement order of a corresponding light emitting diode). In the first thyristor SCR1, the gate P1 thereof is connected to the terminal ΦS, to which VS is supplied via a resistor RS.

The thyristors (SCRn) 164 are set such that a predetermined voltage is maintained at the first thyristor and voltages thereof decrease by a predetermined potential (Vf: forward falling voltage of diode) as the number of arrangement order increases. Further, the cathode of each light emitting diode (LEDn) 162 is connected to a terminal ΦD, to which VDATA is supplied via a resistor R.

In the first step, when the relations of VS=VDD and V1=VGA are set, the first thyristor (SCR1) 164 is turned on in the same manner as in the individual light emitting diode illustrated in FIG. 19. At this time, the gate P2 of the succeeding thyristor (SCR2) 164 has a potential of VDD-Vf, and the cathode of the thyristor (SCR2) 164 is connected to the terminal Φ2. In this state, Φ2=VDD. Therefore, the thyrister (SCR2) 164 remains off. Further, the gate P3 of the succeeding thyrister (SCR3) 164 has a low potential of VDD-2Vf. Therefore, the thyristor (SCR3) 164 remains off.

When in the above-described state, the state of VDATA= VGA is set and a lighting signal for the first light emitting diode (LED 1) 162, that is, image data is applied, the light emitting diode (LED 1) 162 emits a predetermined amount of light. After the first light emitting diode (LED 1) 162 has emitted light for a predetermined period of time, for example, for a period of time corresponding to an image density with the state of VDATA=VGA being set, it is turned off with the state of VDATA=VDD being set.

In the second step, with the state of V2=VGA being set, the second thyristor (SCR2) 164 is turned on in the same manner as described above. After a predetermined period of time required until the gate P2 of the second thyristor (SCR2) 164 reaches a potential of VDD, has passed, the first thyristor (SCR1) 164 is turned off with the states of V1=VDD and Vs=VGA being set, so that the light emitting diode (LED1) 162 which has been already turned on, is not turned on by the subsequent lighting signal. A charge of a parasitic capacity stored in the gate P1 of the first thyristor (SCR1) 164 is discharged via the resistor RG1. After a predetermined period of time has passed in which the thyristor (SCR1) 164 is completely turned off, only the second thyristor (SCR2) 164 is turned on. Other thyristors (SCR1 and SCR3) 164 remain off due to the state of V1=VDD being set.

When in the above-described state, the state of VDATA= VGA is set and a lighting signal for the second light emitting diode (LED2) 162, that is, image data is applied, the light emitting diode (LED2) 162 emits a predetermined amount of light. After the light emitting diode (LED2) 162 has been made to emit light for a predetermined period of time, that is, a period of time corresponding to the image density with the state of VDATA=VGA, the light emitting diode (LED2) 162 is turned off with the state of VDATA=VDD.

Due to the above-described steps being repeatedly carried out, the SLED 160 outputs light as if it scanned (referred to as self scanning) and a latent image can be formed on the photosensitive material drum 16 in such a manner as to sequentially turn on an odd-numbered thyristor and an even-numbered thyristor by the clock signal V1 and the clock signal V2 respectively and further sequentially turn on the light emitting diodes LED by utilizing a common VDATA signal.

Next, a description will be given of the operation of the lighting control section for controlling lighting of the SLED 160 with reference to FIG. 22. The lighting control section shown in FIG. 22 is formed with the function equal to the lighting control section shown in FIG. 5 being applied to the SLED.

Figure 22:
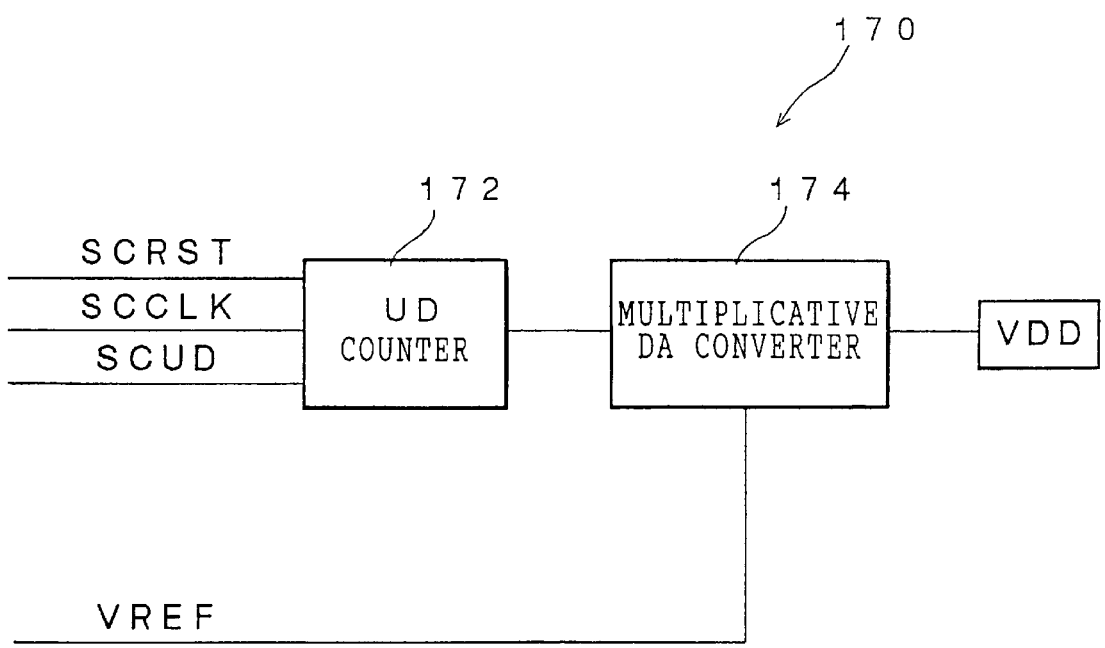
FIG. 22 is a block diagram which shows the structure of a lighting control section for controlling lighting of SLED.
Figure 23:
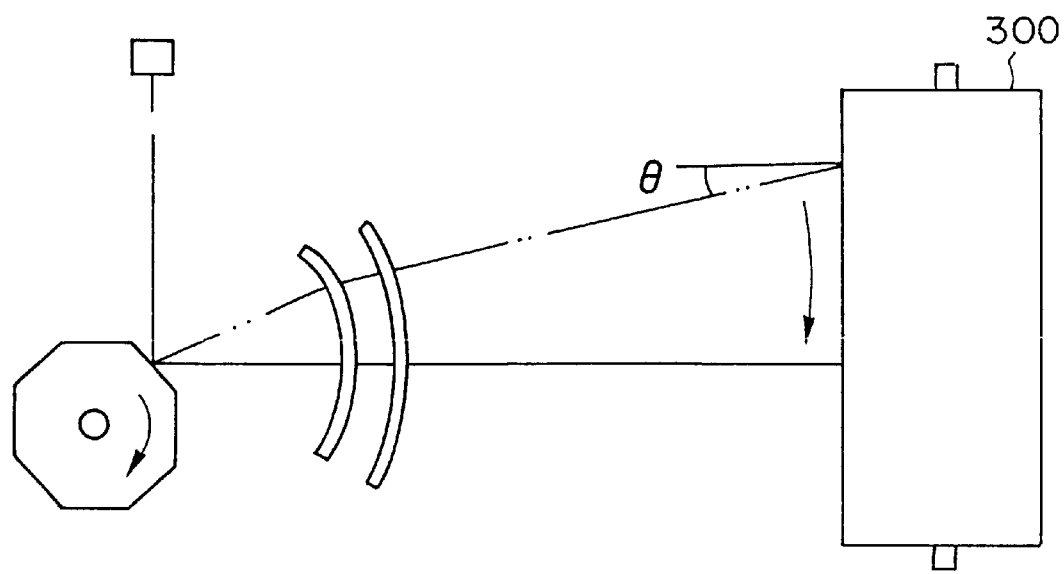
FIG. 23 is a diagram which illustrates the definition of an angle of incidence on a photosensitive member (prior art).
Figure 24A:
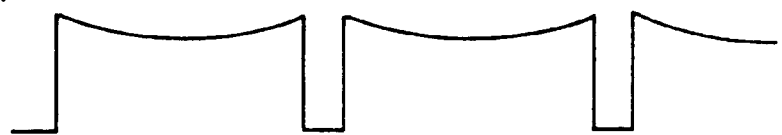
FIGS. 24A to 24C are diagrams which illustrate setting of driving current based on change of the angle of incidence shown in FIG. 23 (prior art).
Figure 24B:
Figure 24C:
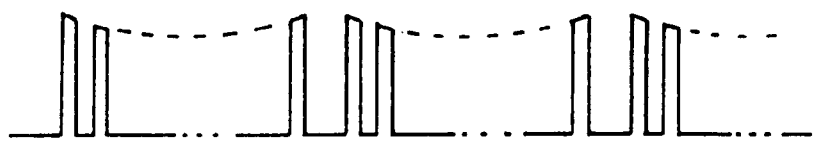
Figure 25:
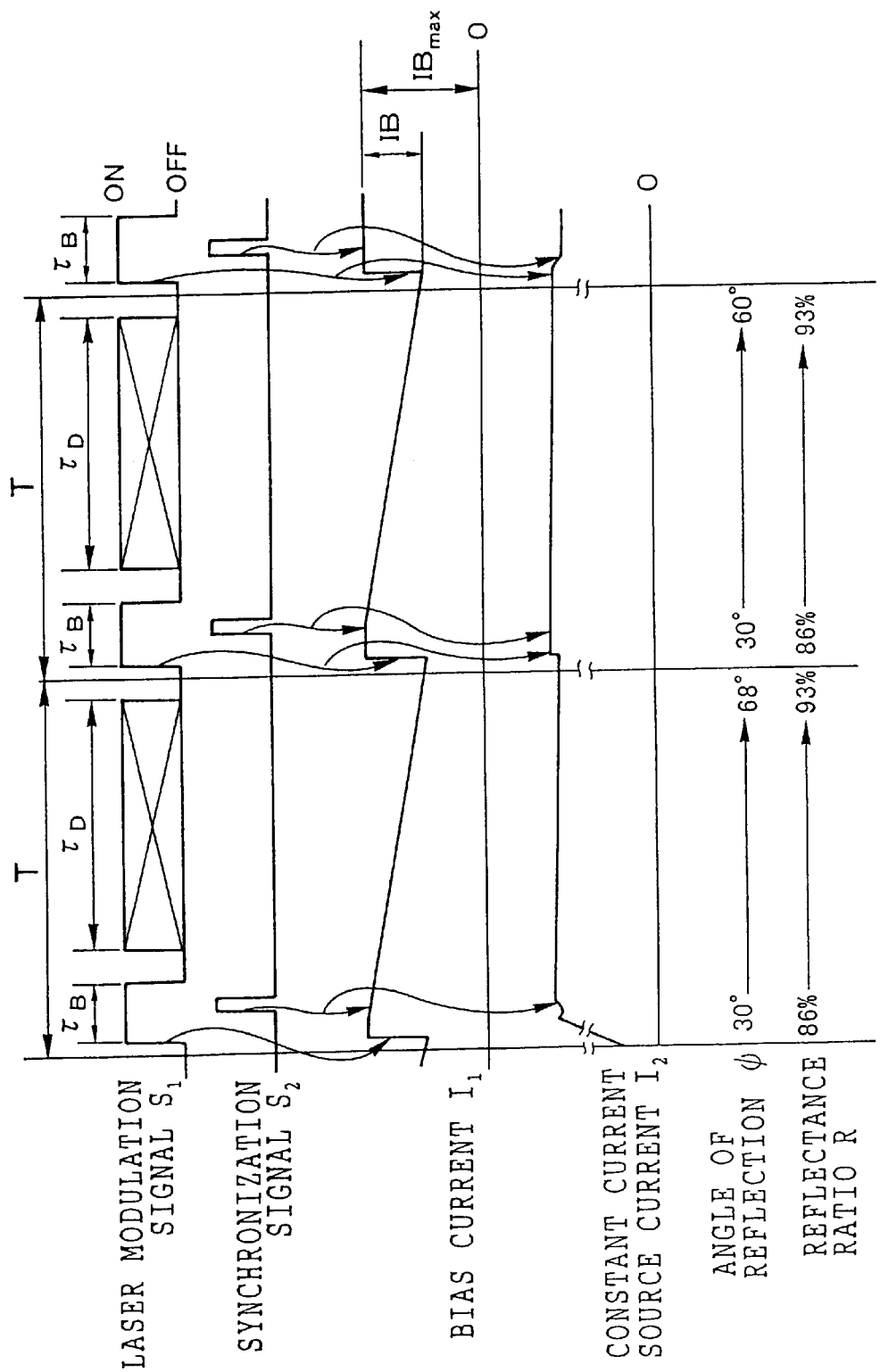
FIG. 25 is a diagram which illustrates setting of bias current based on change of the angle of incidence on a deflector (prior art).
Figure 26:
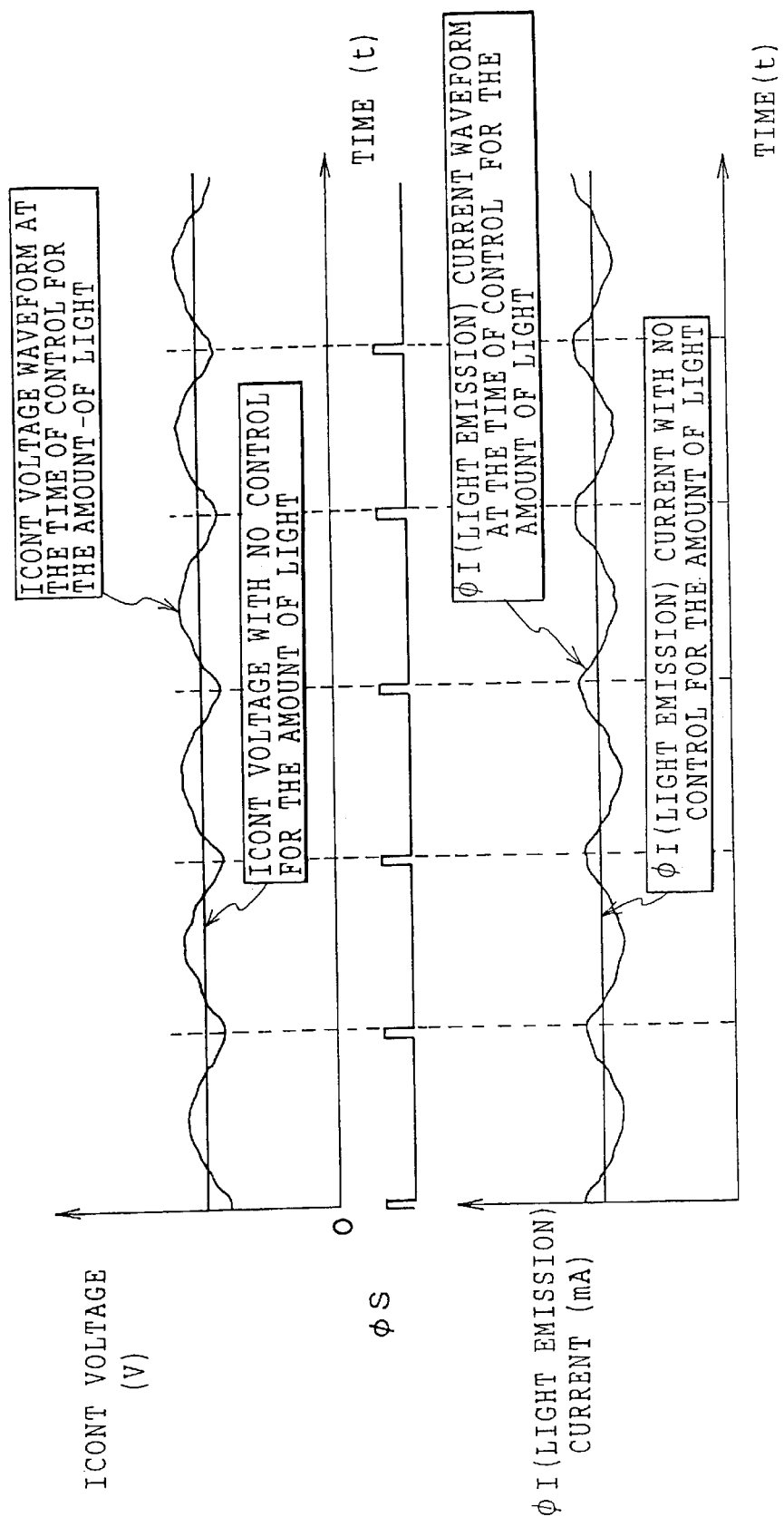
FIG. 26 is a diagram which illustrates correction for ununiformity in the amount of light by driving current of an LED in an LED array (prior art).

As shown in FIG. 22, the lighting control section 170 is structured so as to include an up/down (UD) counter 172 and a multiplicative DA converter 174. Normally, in an exposure apparatus using an LED array, almost no change in the amount of light is made by self-heating or an outside temperature like LED. Therefore, closed loop control for the amount of light (so-called APC) is not effected. However, variations in the amounts of light between the light emitting diodes are made for reasons of manufacturing. Therefore, variations in the amounts of light are measured at the time of manufacturing, and the respective amounts of light of the light emitting diodes are in advance stored in a RAM or the like so as to correct the variations in the amounts of light. Based on the correction information, the amounts of light are controlled when each light emitting diode is turned on. There has been known a method for controlling the amount of light itself in each light emitting diode and a method for controlling a time for which each light emitting diode is turned on. In the present embodiment, the variations in the amounts of light at the time of manufacturing are corrected by controlling the time for which each light emitting diode is turned on using an image data (VDATA) generation circuit (not shown).

The lighting control section 170 is connected to the correction control section 40, and the reset signal SCRST, the clock signal SCCLK, and the up/down signal SCUD from the correction control section 40 are inputted to the UD counter 172. The UD counter 172 counts the number of clocks of the clock signal SCCLK and outputs the count value, as an 8-bit digital signal, to the multiplicative DA converter 174. Further, the UD counter 172 resets the count value based on the reset signal SCRST, and based on the up/down signal SCUD, effects switching between up counting and down counting.

The control level voltage VREF from the correction control section 40 is inputted to the multiplicative DA converter 174, and multiplication of the control level voltage VREF and the count value (8-bit digital signal) from the UD counter 172 is carried out to generate the driving voltage VDD. The driving voltage VDD is outputted to the driving circuit 168 of the SLED 160. At this time, the internal impedance at an output stage of the multiplicative DA converter 174 is small and the multiplicative DA converter 174 is desirably structured so as to have the current capacity sufficient for driving the light emitting diode.

In other words, the driving voltage VDD to be supplied to the driving circuit 168 of the SLED 160 changes in time sequence and the SLED can sequentially turn on the light emitting diodes (self-scanning) by changing the driving voltage VDD for each light emitting diode.

As described above, the multiplicative DA converter 174 and the UD counter 172 form the correction means of the present invention, and based on the amount of correction outputted from the correction control section 40, the driving voltage VDD is corrected in the image region, thereby making it possible to correct the ratio in the exposure intensity in the direction in which the light emitting diodes are arranged in the SLED. That is, correction of uneven density in the direction in which the SLEDs are arranged is carried out.

The subsequent operation is effected in the same manner as in the scanning-exposure type image forming apparatus described in the first embodiment, and a description thereof will be omitted. When the SLED is used, the range in which the control level voltage VREF is controlled, is limited by the operable voltage of the thyristor 164. For example, when the value of VREF is small and VDD is 3 V or less, self-scanning of the thyristor (light emitting diode) may become impossible. Therefore, the minimum value of VREF is desirably set at a level at which the above-described self-scanning can be carried out.

Further, in either the scanning-exposure type image forming apparatus and the array light source type image forming apparatus, naturally, pulse width control can be used for controlling the amount of exposure.

As described above, the present invention has an excellent effect in that density unevenness of an image in the main scanning direction of light beams or in the direction in which light emission points of the array light source are arranged, can be reduced.

What is claimed is:

1. A density correction method in an image forming apparatus in which a planar latent image is formed by sub-scanning in which a main scanning position of a light beam is moved relatively to an image retaining member while main scanning of a light beam is being effected on the image retaining member, and the latent image is developed and transferred to an image recording medium, thereby forming an image on the image recording medium, said method comprising the steps of:

detecting an image density of an image on one of the image retaining member and the image recording medium;

based on the image density, calculating an amount of correction in an intensity of the light beam in an image region within a range of one main scan;

correcting the intensity of the light beam in the image region in accordance with the amount of correction; and when the amount of correction in the intensity of the light beam is changed, changing the intensity so that a predetermined parameter value detected within a predetermined portion of the image region remains substantially equal before and after the amount of correction is changed, thereby creating a uniformity of the image density in the main scanning direction of the light beam.

2. The density correction method of claim 1, wherein the predetermined parameter value is the intensity of the light beam within the predetermined portion of the image region, and further comprising the step of:

before correcting the light beam in the image region, controlling automatically the intensity of the light beam at a predetermined intensity level based on the image density, thereby the intensity of the light beam in the predetermined portion of the image region remains substantially equal before and after the light beam is corrected.

3. A density correction method in an image forming apparatus in which a planar latent image is formed by causing light from an array light source having plural light emission points arranged therein, to be imaged in an image forming region on an image retaining member and by effecting sub-scanning in which a position at which the light is imaged, is moved relatively to the image retaining member, and the latent image is developed and transferred to an image recording medium, thereby forming an image on the image recording medium, said method comprising the step of:

based on a density of an image on one of the image retaining member and the image recording medium, correcting light emission intensities of the plural light emission points in a direction in which the light emission points are arranged so as to allow correction of a uniformity of the image density in the direction in which the light emission points are arranged.

4. A density correction method according to claim 3, further comprising the steps of:

after the light emission intensities of the plural light emission points are each previously controlled automatically at a predetermined level, based on the density of an image on one of the image retaining member and the image recording medium, correcting the respective light emission intensities of the plural light emission points in the direction in which the light emission points are arranged; and when an amount of correction of the light emission intensities based on the image density is corrected, changing the intensity level so that one of the light emission intensity in a predetermined portion of the image forming region, and an average value of the light emission intensities in the direction in which the light emission points are arranged, becomes substantially equal before and after the amount of correction is changed.

5. A density correction method according to claim 6, further comprising the step of:

when the intensity level is changed, changing the amount of correction if the changed intensity level exceeds a predetermined range, thereby allowing the intensity level to be held within the predetermined range.

6. An image forming apparatus in which a planar latent image is formed by sub-scanning in which a main scanning position of a light beam is moved relatively to an image retaining member while main scanning of a light beam is being effected on the image retaining member, and the latent image is developed and transferred to an image recording medium, thereby forming an image on the image recording medium, said apparatus comprising:

amount-of-correction setting means for setting, based on a density of an image on one of the image retaining member and the image recording medium, an amount of correction for correcting ununiformity of the image density in a main scanning direction of the light beam;

correction means for correcting, based on the amount of correction set by said amount-of-correction setting means, an intensity of the light beam in an image region within a range of one main scan; and intensity level changing means which, when setting of the amount of correction by said amount-of-correction setting means is changed, changes the intensity level so that one of the intensity of the light beam in a predetermined portion of the image region and an average value of intensities of the light beam in the main scanning direction becomes substantially equal before and after the setting is changed.

7. An image forming apparatus according to claim 6, further comprising detecting means for automatically detecting the density of an image on one of the image retaining member and the image recording medium, wherein said amount-of-correction setting means determines the amount of correction based on a result of detection by said detecting means.

8. The image forming apparatus of claim 6, further comprising:

intensity control means for automatically controlling the intensity of the light beam at a predetermined intensity level.

9. An image forming apparatus in which a planar latent image is formed by causing light from an array light source having plural light emission points arranged therein, to be imaged in an image forming region on an image retaining member, by effecting sub-scanning in which a position at which the light is imaged is moved relatively to the image retaining member, and the latent image is developed and transferred to an image recording medium, thereby forming an image on the image recording medium, said apparatus comprising:

amount-of-correction setting means for setting, based on a density of an image on one of the image retaining member and the image recording medium, an amount of correction for allowing correction of ununiformity of the image density in the direction in which the light emission points are arranged; and correction means for correcting, based on the amount of correction set by said amount-of-correction setting means, light emission intensities of the plural light emission points in the direction in which the light emission points are arranged.

10. The image forming apparatus according to claim 9, further comprising:

intensity control means for automatically controlling each of light emission intensities of the plural light emission points at a predetermined intensity level; and intensity level changing means which, when setting of the amount of correction by said amount-of-correction setting means is changed, changes the intensity level so that one of the light emission intensity in a predetermined portion of an image region, and an average value of the light emission intensities in the direction in which the light emission points are arranged becomes substantially equal before and after the setting is changed.

11. The image forming apparatus according to claim 10, further comprising:

amount-of-correction changing means which makes a determination as to whether the intensity level changed by said intensity level changing means is within a predetermined range, and when it is determined that the changed intensity level exceeds the predetermined range, said amount-of-correction changing means changing the amount of correction so that the intensity level is held within the predetermined range.

12. The image forming apparatus according to claim 10, further comprising:

alarm signal output means which makes a determination as to whether the intensity level changed by said intensity level changing means is within a predetermined range, and when it is determined that the changed intensity level exceeds the predetermined range, said alarm signal output means outputting an alarm signal.

13. An image forming apparatus according to claim 9, further comprising pattern input means for inputting information which indicates a correction pattern of the image density, wherein said amount-of-correction setting means determines the amount of correction based on the information inputted from said pattern input means.

14. An image forming apparatus according to claim 13, further comprising level input means for inputting information which indicates a correction level of the image density, wherein said amount-of-correction setting means determines the amount of correction based on the information inputted from said level input means.

15. An image forming apparatus according to claim 9, further comprising detecting means for automatically detecting the density of an image on one of the image retaining member and the image recording medium, wherein said amount-of-correction setting means determines the amount of correction based on a result of detection by said detecting means.

16. A density correction method in an image forming apparatus in which a planar latent image is formed by sub-scanning in which a main scanning position of a light beam is moved relatively to an image retaining member while main scanning of a light beam is being effected on the image retaining member, and the latent image is developed and transferred to an image recording medium, thereby forming an image on the image recording medium, said method comprising the steps of:

based on a density of an image on one of the image retaining member and the image recording medium, correcting an intensity of the light beam in an image region within a range of one main scan so as to allow correction of a uniformity of the image density in a main scanning direction of the light beam;

after the intensity of the light beam is in advance controlled automatically at a predetermined intensity level, based on the density of an image on one of the image retaining member and the image recording medium, correcting the intensity of the light beam in the image region within a range of one main scan; and when an amount of correction in the intensity of a light beam based on the image density is changed, changing the intensity so that one of an intensity of the light beam in a predetermined portion of the image region, and an average value of intensities of the light beams in the main scanning direction becomes substantially equal before and after the amount of correction is changed.

17. The density correction method of claim 16, further comprising the step of, when the intensity level is changed, changing the amount of correction if the changed intensity level exceeds a predetermined range, thereby allowing the intensity level to be held within the predetermined range.

18. An image forming apparatus in which a planar latent image is formed by sub-scanning in which a main scanning position of a light beam is moved relatively to an image retaining member while main scanning of a light beam is being effected on the image retaining member, and the latent image is developed and transferred to an image recording medium, thereby forming an image on the image recording medium, said apparatus comprising:

amount-of-correction setting means for setting, based on a density of an image on one of the image retaining member and the image recording medium, an amount of correction for correcting ununiformity of the image density in a main scanning direction of the light beam;

correction means for correcting, based on the amount of correction set by said amount-of-correction setting means, an intensity of the light beam in an image region within a range of one main scan;

intensity control means for automatically controlling the intensity of the light beam at a predetermined intensity level; and intensity level changing means which, when setting of the amount of correction by said amount-of-correction setting means is changed, changes the intensity level so that one of the intensity of the light beam in a predetermined portion of the image region, and an average value of intensities of the light beam in the main scanning direction becomes substantially equal before and after the setting is changed.

19. The image forming apparatus of claim 18, further comprising:

amount-of-correction changing means which makes a determination as to whether the intensity level changed by said intensity level changing means is within a predetermined range, and when it is determined that the changed intensity level exceeds the predetermined range, said amount-of-correction changing means changing the amount of correction so that the intensity level is held within the predetermined range.

20. The image forming apparatus according to claim 18, further comprising:

alarm signal output means which makes a determination as to whether the intensity level changed by said intensity level changing means is within a predetermined range, and when it is determined that the changed intensity level exceeds the predetermined range, said alarm signal output means outputting an alarm signal.

21. The image forming apparatus of claim 18, further comprising detecting means for automatically detecting the density of an image on one of the image retaining member and the image recording medium, wherein said amount-of-correction setting means determines the amount of correction based on a result of detection by said detecting means.

22. An image forming apparatus in which a planar latent image is formed by sub-scanning in which a main scanning position of a light beam is moved relatively to an image retaining member while main scanning of a light beam is being effected on the image retaining member, and the latent image is developed and transferred to an image recording medium, thereby forming an image on the image recording medium, said apparatus comprising:

amount-of-correction setting means for setting, based on a density of an image on one of the image retaining member and the image recording medium, an amount of correction for correcting ununiformity of the image density in a main scanning direction of the light beam;

correction means for correcting, based on the amount of correction set by said amount-of-correction setting means, an intensity of the light beam in an image region within a range of one main scan; and pattern input means for inputting information which indicates a correction pattern of the image density, wherein said amount of correction setting means determines the amount of correction based on the information inputted from said pattern input means.

23. The image forming apparatus of claim 22, further comprising level input means for inputting information which indicates a correction level of the image density, wherein said amount-of-correction setting means determines the amount of correction based on the information inputted from said level input means.

24. The image forming apparatus of claim 22, further comprising detecting means for automatically detecting the density of an image on one of the image retaining member and the image recording medium, wherein said amount-of-correction setting means determines the amount of correction based on a result of detection by said detecting means.

25. A density correction method in an image forming apparatus in which a planar latent image is formed by causing light from an array light source having plural light emission points arranged therein, to be imaged in an image forming region on an image retaining member and by effecting sub-scanning in which a position at which the light is imaged, is moved relatively to the image retaining member, and the latent image is developed and transferred to an image recording medium, thereby forming an image on the image recording medium, said method comprising the steps of:

detecting an image density of an image on one of the image retaining member and the image recording medium;

based on the image density, computing an amount of correction in light emission intensities of the plural light emission points in a direction in which the light emission points are arranged;

correcting light emission intensities of the plural light emission points according to the amount of correction in light emission intensities; and when the amount of correction in the light emission intensities is changed, changing the intensity so that a predetermined parameter value detected within a predetermined portion of the image region remains substantially equal before and after the amount of correction is changed, thereby creating a uniformity of the image density in the direction in which the light emission points are arranged.

26. The density correction method of claim 25, wherein the predetermined parameter value is an average value of the light emission intensities in the direction in which the light emission points are arranged, and further comprising the step of:

before correcting the light emission in the direction in which the light emission points are arranged, controlling automatically the light emission intensities of each of the plural light emission points at a predetermined level based on the image density, thereby the average value of the light emission intensities in the direction in which the light emission points are arranged remains substantially equal before and after the correction of the light emission.

* * * * *